(12) United States Patent
Mita et al.

(10) Patent No.: US 10,177,407 B2
(45) Date of Patent: Jan. 8, 2019

(54) NONAQUEOUS ELECTROLYTE SOLUTION FOR SECONDARY BATTERY, SECONDARY BATTERY, BATTERY PACK, ELECTRICALLY DRIVEN VEHICLE, POWER STORAGE SYSTEM, ELECTRICALLY DRIVEN TOOL, AND ELECTRONIC APPARATUS

(71) Applicant: Murata Manufacturing Co., Ltd., Kyoto (JP)

(72) Inventors: Hiroki Mita, Kanagawa (JP); Tadahiko Kubota, Kanagawa (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 91 days.

(21) Appl. No.: 14/622,061

(22) Filed: Feb. 13, 2015

(65) Prior Publication Data

US 2015/0236381 A1 Aug. 20, 2015

(30) Foreign Application Priority Data

Feb. 20, 2014 (JP) .................................. 2014-030328

(51) Int. Cl.
*H01M 10/0567* (2010.01)
*H01M 10/052* (2010.01)
(Continued)

(52) U.S. Cl.
CPC ......... *H01M 10/0567* (2013.01); *B60L 1/003* (2013.01); *B60L 1/06* (2013.01); *B60L 3/0046* (2013.01); *B60L 3/12* (2013.01); *B60L 7/14* (2013.01); *B60L 8/003* (2013.01); *B60L 8/006* (2013.01); *B60L 11/123* (2013.01); *B60L 11/1861* (2013.01); *B60L 11/1864* (2013.01); *B60L 11/1879* (2013.01); *H01M 10/052* (2013.01); *H02J 7/0091* (2013.01);
(Continued)

(58) Field of Classification Search
None
See application file for complete search history.

(56) References Cited

U.S. PATENT DOCUMENTS

2010/0178569 A1* 7/2010 Ihara .................... H01M 4/133
429/325
2011/0076572 A1* 3/2011 Amine .................. H01M 10/05
429/328
(Continued)

FOREIGN PATENT DOCUMENTS

JP 2008-027782 2/2008
JP 2009-245829 10/2009
(Continued)

*Primary Examiner* — Eli S Mekhlin
(74) *Attorney, Agent, or Firm* — K&L Gates LLP

(57) ABSTRACT

Provided is a secondary battery including a positive electrode, a negative electrode, and a nonaqueous electrolyte solution. The nonaqueous electrolyte solution includes a boron compound having a quaternary structure expressed by Formula (1).

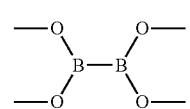

(1)

10 Claims, 9 Drawing Sheets

(51) Int. Cl.

| | | |
|---|---|---|
| *B60L 1/00* | (2006.01) | |
| *B60L 1/06* | (2006.01) | |
| *B60L 3/00* | (2006.01) | |
| *B60L 3/12* | (2006.01) | |
| *B60L 7/14* | (2006.01) | |
| *B60L 8/00* | (2006.01) | |
| *B60L 11/12* | (2006.01) | |
| *B60L 11/18* | (2006.01) | |
| *H02J 7/00* | (2006.01) | |

(52) U.S. Cl.
CPC ....... *B60L 2210/40* (2013.01); *B60L 2240/34* (2013.01); *B60L 2240/545* (2013.01); *B60L 2240/547* (2013.01); *B60L 2240/549* (2013.01); *H01M 2220/20* (2013.01); *H01M 2220/30* (2013.01); *H01M 2300/0025* (2013.01); *Y02E 60/122* (2013.01); *Y02T 10/6217* (2013.01); *Y02T 10/7011* (2013.01); *Y02T 10/7044* (2013.01); *Y02T 10/7061* (2013.01); *Y02T 10/7077* (2013.01); *Y02T 10/7083* (2013.01); *Y02T 10/7241* (2013.01)

(56) References Cited

U.S. PATENT DOCUMENTS

| | | | |
|---|---|---|---|
| 2013/0136985 A1* | 5/2013 | Fujiki | H01M 4/131 429/220 |
| 2014/0023941 A1* | 1/2014 | Amine | H01M 10/0568 429/405 |
| 2015/0180087 A1* | 6/2015 | Kim | H01M 10/0567 429/332 |

FOREIGN PATENT DOCUMENTS

| | | |
|---|---|---|
| JP | 2010-212153 | 9/2010 |
| JP | 2013-098057 | 5/2013 |

* cited by examiner

NONAQUEOUS ELECTROLYTE SOLUTION FOR SECONDARY BATTERY, SECONDARY BATTERY, BATTERY PACK, ELECTRICALLY DRIVEN VEHICLE, POWER STORAGE SYSTEM, ELECTRICALLY DRIVEN TOOL, AND ELECTRONIC APPARATUS

CROSS REFERENCES TO RELATED APPLICATIONS

The present application claims priority to Japanese Priority Patent Application JP 2014-030328 filed in the Japan Patent Office on Feb. 20, 2014, the entire content of which is hereby incorporated by reference.

BACKGROUND

The present disclosure relates to a nonaqueous electrolyte solution that is used in a secondary battery, a secondary battery using the nonaqueous electrolyte solution, and a battery pack, an electrically driven vehicle, a power storage system, an electrically driven tool, and an electronic apparatus which use the secondary battery.

Recently, various electronic apparatuses such as a portable phone and a personal digital assistant (PDA) have been spreading widely, and a further reduction in size and weight, and a long operational lifespan of the electronic apparatuses are strongly demanded. Along with this, development of a battery as a power supply, particularly, a secondary battery which is small in size and is light in weight and which can obtain a high energy density has progressed.

Recently, application of the secondary battery to various uses has been examined without limitation to the above-described electronic apparatuses. Examples of the application includes a battery pack that is detachably mounted in an electronic apparatus, an electrically driven vehicle such as an electric vehicle, a power storage system such as a power server for home use, and an electrically driven tool such as an electrically driven drill.

To obtain a battery capacity, secondary batteries using various charging and discharging principles have been suggested, and among these, a secondary battery using intercalation and deintercalation of an electrode reaction material or precipitation and dissolution of the electrode reaction material has attracted attention. This is because the secondary battery can obtain an energy density higher than that of a lead battery, a nickel cadmium battery, and the like.

The secondary battery includes a nonaqueous electrolyte solution in combination with a positive electrode and a negative electrode. The positive electrode includes a positive electrode active material that participates in a charging and discharging reaction, and the negative electrode includes a negative electrode active material that participates in the charging and discharging reaction. The nonaqueous electrolyte solution includes a nonaqueous solvent and an electrolyte salt. A composition of the nonaqueous electrolyte solution has a great effect on battery characteristics, and thus various examinations have been made with respect to the composition of the nonaqueous electrolyte solution.

Specifically, to improve charging and discharging cycle lifespan characteristics and the like, a compound that contains boron (B) as a constituent element is contained in the nonaqueous electrolyte solution (for example, refer to Japanese Unexamined Patent Application Publication Nos. 2008-027782, 2009-245829, 2010-212153, and 2013-098057). Examples of the compound include boronic acid compound and the like.

SUMMARY

Along with higher performance and multi-functionalization of an electronic apparatus and the like, frequency of use of the electronic apparatus and the like have increased, and thus there is a tendency that the secondary battery is frequently charged and discharged. Accordingly, with regard to battery characteristics of the secondary battery, there is still room for improvement.

It is desirable to provide a nonaqueous electrolyte solution for a secondary battery which is capable of obtaining excellent battery characteristics, a secondary battery, a battery pack, an electrically driven vehicle, a power storage system, an electrically driven tool, and an electronic apparatus.

According to an embodiment of the present disclosure, there is provided a nonaqueous electrolyte solution for a secondary battery which includes a boron compound having a quaternary structure expressed by Formula (1).

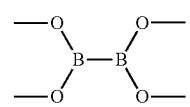

According to another embodiment of the present disclosure, there is provided a secondary battery including a positive electrode, a negative electrode, and a nonaqueous electrolyte solution. The nonaqueous electrolyte solution has the same configuration as the nonaqueous electrolyte solution for a secondary battery of the present disclosure.

According to still another embodiment, there are provided a battery pack, an electrically driven vehicle, a power storage system, an electrically driven tool, and an electronic apparatus which include a secondary battery. The secondary battery has the same configuration as that of the secondary battery of the present disclosure.

According to the nonaqueous electrolyte solution for the secondary battery or the secondary battery of the present disclosure, the above-described boron compound is included, and thus it is possible to obtain excellent battery characteristics. In addition, even in the battery pack, the electrically driven vehicle, the power storage system, the electrically driven tool, or the electronic apparatus of the present disclosure, it is possible to obtain the same effect as described above.

Additional features and advantages are described herein, and will be apparent from the following Detailed Description and the figures.

DETAILED DESCRIPTION

Figure 1:
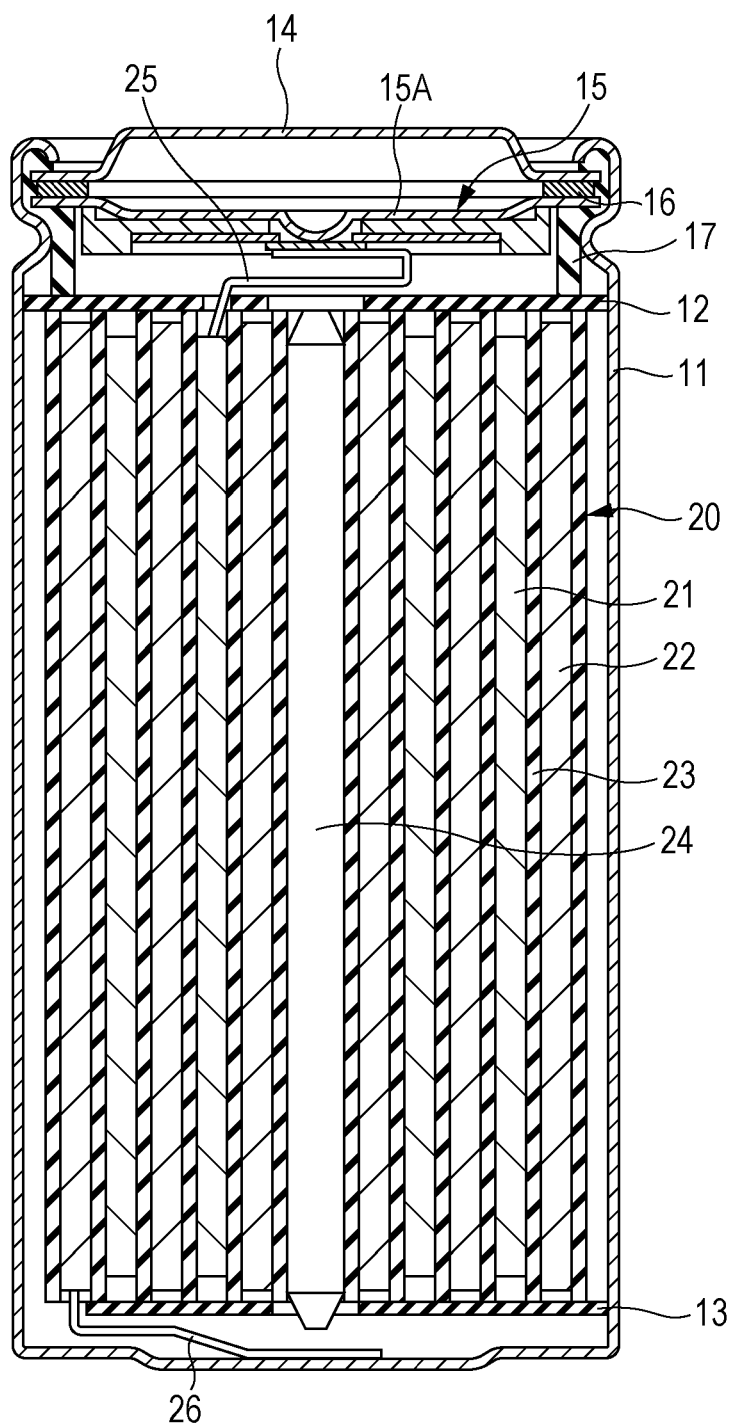
FIG. 1 is a cross-sectional view illustrating a configuration of a secondary battery (cylindrical type) according to an embodiment of the present disclosure.

Hereinafter, an embodiment of the present disclosure will be described in detail with reference to the attached drawings. In addition, the order of description is as follows.

1. Nonaqueous electrolyte solution for Secondary Battery
2. Secondary Battery
2-1. Lithium Ion Secondary Battery
2-1-1. Cylindrical Type
2-1-2. Laminated Film Type
2-2. Lithium Metal Secondary Battery
3. Use of Secondary Battery
3-1. Battery Pack (Single Battery)
3-2. Battery Pack (Assembled Battery)
3-3. Electrically Driven Vehicle
3-4. Power Storage System
3-5. Electrically Driven Tool 1. Nonaqueous Electrolyte Solution for Secondary Battery First, a nonaqueous electrolyte solution for a secondary battery (hereinafter, simply referred to as an "electrolyte solution") of the present disclosure will be described.

The electrolyte solution described here is used, for example, in a lithium secondary battery and the like. However, the type of the secondary battery in which the electrolyte solution is used is not limited to the lithium secondary battery.

Boron Compound

The electrolyte solution includes any one kind or two more kinds of boron compounds, and the boron compounds have a quaternary structure (boron and oxygen containing structure) expressed by Formula (1).

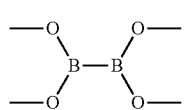
(1)

The quaternary structure expressed by Formula (1) is a structure (boron and oxygen containing structure) including boron (B) and oxygen (O) as a constituent element, and details of the boron and oxygen containing structure are as follows.

First, other atoms and other atomic groups do not exist between two boron atoms (B), and thus the two boron atoms are directly bonded to each other. Accordingly, a boron and oxygen containing bond has a boron-boron bond (>B—B<).

Second, two oxygen atoms (O) are bonded to each boron atom, and each of the oxygen atoms has one bonding hand. Accordingly, the boron and oxygen containing structure has a total of four bonding hands, and is so-called quaternary.

The kind of the boron compounds is not particularly limited as long as the boron compounds are compounds having the boron and oxygen containing structure. That is, the boron and oxygen containing structure is quaternary as a whole, and thus four groups (supplementary groups) are introduced (bonded) to the four bonding hands, but the kind of the supplementary groups is not particularly limited as long as the supplementary groups are monovalent groups.

The kinds of the four supplementary groups may be the same as each other or may be different from each other. In addition, parts of the four supplementary groups may be the same kind of groups. In addition, two supplementary groups may be bonded to each other.

The kind of an element (supplementary element) that constitutes the supplementary groups is not particularly limited as long as the element is any one kind or two or more kinds of arbitrary elements. Specific examples of the supplementary element include hydrogen (H), carbon (C), oxygen (O), nitrogen (N), sulfur (S), fluorine (F), chlorine (Cl), bromine (Br), and iodine (I). However, the supplementary element may be an element other than the above-described elements.

Among the element, it is preferable that the supplementary group is a group having a carbon chain as a skeleton. This is because a boron compound can be easily synthesized, and solubility, compatibility, and the like of the boron compound are secured. The carbon chain may have a straight chain shape or a diverged shape having one or more side chains.

The reason why the electrolyte solution includes the boron compound is because the following advantages can be obtained in comparison to a case where the electrolyte solution does not include the boron compound. First, chemical stability of the electrolyte solution is improved, and thus the electrolyte solution itself is less likely to decompose. Second, a film derived from the boron compound is formed on the surface of the electrodes (the positive electrode and the negative electrode), and thus a decomposition reaction of the electrolyte solution which is caused by reactivity of the electrodes is suppressed. According to this, the decomposition reaction of the electrolyte solution during charging and discharging is suppressed significantly, and thus a discharging capacity is less likely to decrease even when undergoing charging and discharging.

Specifically, it is preferable that the boron compound includes one compound or both compounds of compounds which are expressed by Formula (2) and Formula (3), respectively. This is because the boron compound can be easily synthesized and solubility, compatibility, and the like of the boron compound are secured.

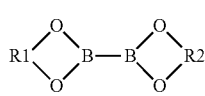
(2)

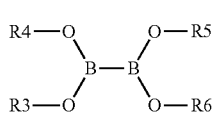
(3)

(provided that, each of R1 and R2 represents either a divalent hydrocarbon group or a divalent halogenated hydrocarbon group. Each of R3 to R6 represents any one of a hydrogen group, a halogen group, a monovalent hydrocarbon group, and a monovalent halogenated hydrocarbon group.)

The boron compound expressed by Formula (2) (hereinafter, referred to as a "first boron compound") includes a cyclic portion.

In the first boron compound, two oxygen atoms are bonded to one boron atom on one side, and the two oxygen atoms are connected to each other through R1. In addition, two oxygen atoms are bonded to one boron atom on the other side, and the two oxygen atoms are connected to each other through R2. According to this, at a left portion of the first boron compound, a ring (a left ring) is formed by the boron atom, the two oxygen atoms, and R1, and at a right portion, a ring (right ring) is formed by the boron atom, the two oxygen atoms, and R2.

The kind of R1 and R2 is not particularly limited as long as each of R1 and R2 is either a divalent hydrocarbon group or a divalent halogenated hydrocarbon group. This is because it is possible to obtain advantages derived from the boron compound without depending on the kind of R1 and R2. In addition, R1 and R2 may be the same kind of groups or different kinds of groups.

The divalent hydrocarbon group is a general term of a divalent group including carbon and hydrogen as a constituent element. The divalent hydrocarbon group may have a straight chain shape, or a diverged shape having one or more side chains. In addition, the divalent hydrocarbon group may be a saturated hydrocarbon group that does not include a carbon-carbon multiple bond, or an unsaturated hydrocarbon group that includes one or more carbon-carbon multiple bonds. The carbon-carbon multiple bond is one or both of a carbon-carbon double bond (>C=C<) and a carbon-carbon triple bond (—C≡C—).

The divalent halogenated hydrocarbon group represents a group in which one or more hydrogen groups (—H) in the above-described divalent hydrocarbon groups are substituted with a halogen group. Examples of the halogen group include any one kind or two or more kinds of a fluorine group (—F), a chlorine group (—Cl), a bromine group (—Br), an iodine group (—I), and the like. In addition, in a case where the divalent halogenated hydrocarbon group includes a plurality of halogen groups, the plurality of halogen groups may be the same kind of groups, or may be different kinds of groups. In addition, parts of the plurality of halogen groups may be the same kind of groups.

Specific examples of the divalent hydrocarbon group include an alkylene group, an alkenylene group, an alkynylene group, a cycloalkylene group, an arylene group, and a group in which two or more kinds of the groups are bonded so as to have two valences.

Specific examples of the alkylene group include a methylene group (—$CH_2$—), an ethylene group (—$C_2H_4$—), a propylene group (—$C_3H_6$—), a butylene group (—$C_4H_8$—), and the like. Specific examples of the alkenylene group include a methine group (—CH=CH—), an ethyne group (—CH=CH—$CH_2$—), and the like. Specific examples of the alkynylene group include an ethynyl group (—C≡C—). Specific examples of the cycloalkylene group include a cyclopropylene group, a cyclobutylene group, a cyclopentylene group, a cyclohexylene group, a cycloheptylene group, a cyclooctylene, and the like. Specific examples of the arylene group include a phenyl group, a naphthyl group, and the like.

Specific examples of a halogenated alkylene group include a perfluoromethylene group (—$CF_2$—), a perfluoroethylene group (—$C_2F_4$—) and a perfluoropropylene group (—$C_3F_6$—), and the like. Specific examples of a halogenated alkenylene group include perfluorovinylene group (—CF=CF—), and the like. Specific examples of a halogenated alkynylene group include perfluoropropynylene group (—C≡C—$CF_2$—), and the like. Specific examples of a halogenated cycloalkylene group include perfluorocyclopropylene group, and the like. Specific examples of a halogenated arylene group include perfluorophenylene group, and the like.

The group in which two or more kinds are bonded so as to have two valences represents a group (hereinafter, referred to as a "divalent bonding group") in which two or more kinds of the above-described divalent hydrocarbon groups and the like are bonded so as to have two valences as a whole. Examples of the divalent bonding group include a group in which the alkylene group and the alkenylene group are bonded to each other, a group in which the alkylene group and the alkynylene group are bonded to each other, a group in which the alkenylene group and the alkynylene group are bonded to each other, and the like. Furthermore, examples of the divalent bonding group include a group in which the alkylene group and the arylene group are bonded to each other, a group in which the alkylene group and the cycloalkylene group are bonded to each other, and the like.

Among these, it is preferable that the divalent hydrocarbon group is the alkylene group. This is because the first boron compound can be easily synthesized, and solubility, compatibility, and the like of the first boron compound are secured.

In addition, the number of carbons of the divalent hydrocarbon group is not particularly limited, but it is preferable that the number of carbons is 1 to 10. This is because the first boron compound can be easily synthesized, and solubility, compatibility, and the like of the first boron compound are secured.

The boron compound expressed by Formula (3) (hereinafter, referred to as a "second boron compound") does not include the above-described cyclic portion.

In the second boron compound, R3 to R6 are bonded to four oxygen atoms, respectively. However, R3 and R4 are not bonded to each other, and R5 and R6 are not bonded to each other. According to this, in the second boron compound, the two rings (the left ring and the right ring) are not formed differently from the first boron compound.

The kind of R3 to R6 is not particularly limited as long as each of R3 to R6 is any one of a hydrogen group, a halogen group, a monovalent hydrocarbon group, and a monovalent halogenated hydrocarbon group. This is because it is possible to obtain advantages derived from the boron compound without depending on the kind of R3 to R6. In addition, R3 to R6 may be the same kind of groups, or may be different kinds of groups. In addition, parts of R3 to R6 may be the same kind of groups.

The monovalent hydrocarbon group is a general term of a monovalent group including carbon and hydrogen as a constituent element. The monovalent hydrocarbon group may have a straight chain shape, or a diverged shape having one or more side chains. In addition, the monovalent hydrocarbon group may be a saturated hydrocarbon group that does not include a carbon-carbon multiple bond, or an unsaturated hydrocarbon group that includes one or more carbon-carbon multiple bonds.

The monovalent halogenated hydrocarbon group represents a group in which one or more hydrogen groups in the above-described monovalent hydrocarbon groups are substituted with a halogen group. For example, details of the kind of the halogen group are as described above.

Specific examples of the monovalent hydrocarbon group include an alkyl group, an alkenyl group, an alkynyl group, a cycloalkyl group, an aryl group, and a group in which two or more kinds of the groups are bonded so as to have one valence.

Specific example of the alkyl group include a methyl group (—CH$_3$), an ethyl group (—C$_2$H$_5$), a propyl group (—C$_3$H$_7$), an n-butyl group (—C$_4$H$_8$), a t-butyl group (—C(—CH$_3$)$_2$—CH$_3$), and the like. Specific examples of the alkenyl group include a vinyl group (—CH=CH$_2$), an allyl group (—CH$_2$—CH=CH$_2$), and the like. Specific examples of the alkynyl group include ethynyl group (—C≡CH), and the like. Specific examples of the cycloalkyl group include a cyclopropyl group, a cyclobutyl group, a cyclopentyl group, a cyclohexyl group, a cycloheptyl group, a cyclooctyl group, and the like. Specific examples of the aryl group include a phenyl group, a naphthyl group, and the like.

Specific examples of a halogenated alkyl group include a perfluoromethyl group (—CF$_3$), a perfluoroethyl group (—C$_2$F$_5$), a perfluoropropyl group (—C$_3$F$_7$), and the like. Specific examples of a halogenated alkenyl group include a perfluorovinyl group (—CF=CF$_2$), and the like. Specific examples of a halogenated alkynyl group include a perfluoroethynyl group (—C≡CF), and the like. Specific examples of a halogenated cycloalkyl group include a perfluorocyclopropyl group, and the like. Specific examples of a halogenated aryl group include a perfluorophenyl group, and the like.

The group in which two or more kinds are bonded so as to have one valence represents a group (hereinafter, referred to as a "monovalent bonding group") in which two or more kinds among the hydrogen group, the halogen group, the monovalent hydrocarbon group, and the monovalent halogenated hydrocarbon group are bonded so as to have one valence as a whole. Examples of the monovalent bonding group include a group in which the alkyl group and the alkenyl group are bonded to each other, a group in which the alkyl group and the alkynyl group are bonded to each other, a group in which the alkenyl group and the alkynyl group are bonded to each other, and the like. Furthermore, examples of the monovalent bonding group include a group in which the alkyl group and the aryl group are bonded to each other, a group in which the alkyl group and the cycloalkyl group are bonded to each other, and the like.

Among these, it is preferable that the monovalent hydrocarbon group is the alkyl group. This is because the second boron compound can be easily synthesized, and solubility, compatibility, and the like of the second boron compound are secured.

In addition, the number of carbons of the monovalent hydrocarbon group is not particularly limited, but it is preferable that the number of carbons is 1 to 10. This is because the second boron compound can be easily synthesized, and solubility, compatibility, and the like of the second boron compound are secured.

Particularly, it is preferable that the first boron compound includes one or both of compounds which are expressed by Formula (2-1) and Formula (2-2), respectively. This is because the first boron compound can be more easily synthesized, and solubility, compatibility, and the like of the first boron compound are further improved.

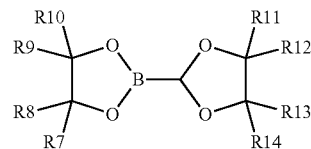

(2-1)

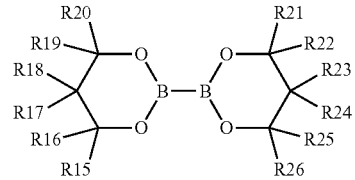

(2-2)

(provided that, each of R7 to R14 represents any one of a hydrogen group, a halogen group, a monovalent hydrocarbon group, and a monovalent halogenated hydrocarbon group. Each of R15 to R26 represents any one of a hydrogen group, a halogen group, a monovalent hydrocarbon group, and a monovalent halogenated hydrocarbon group).

In the first boron compound expressed by Formula (2-1), all of the two rings (the right ring and the left ring) are five-membered rings. R7 to R14 may be the same kind of groups, and may be different kinds of groups. In addition, parts of R7 to R14 may be the same kind of groups.

In the second boron compound expressed by Formula (2-2), all of the two rings are six-membered rings. R15 to R26 may be the same kind of groups, or may be different kinds of groups. In addition, parts of R15 to R26 may be the same kind of groups.

For example, details of R7 to R26 are the same as the details of R3 to R6 described above.

Specific examples of the first boron compound include compounds which are expressed by Formula (1-1) to Formula (1-14), and the like.

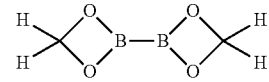

(1-1)

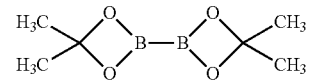

(1-2)

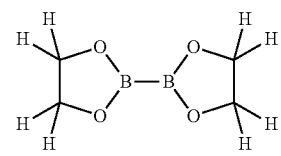

(1-3)

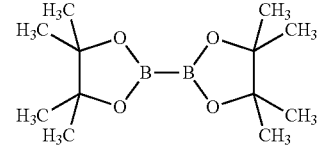

(1-4)

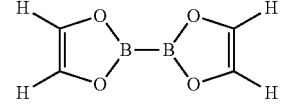

(1-5)

-continued

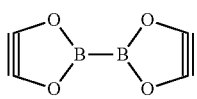 (1-6)

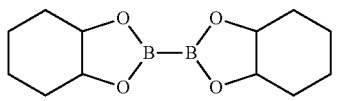 (1-7)

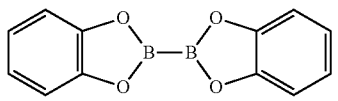 (1-8)

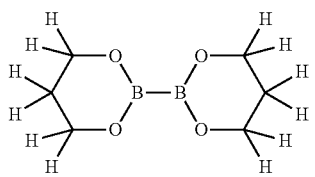 (1-9)

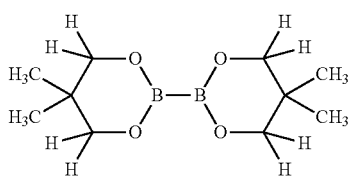 (1-10)

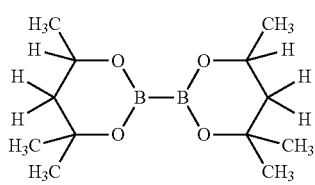 (1-11)

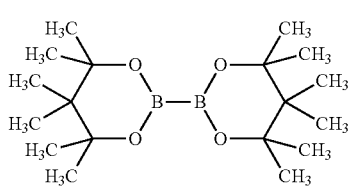 (1-12)

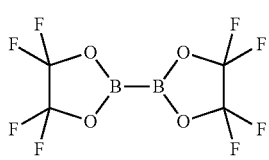 (1-13)

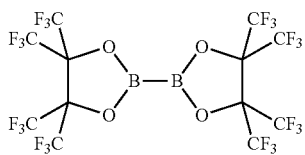 (1-14)

Specific examples of the second boron compound include compounds which are expressed by Formula (1-21) to Formula (1-28), and the like.

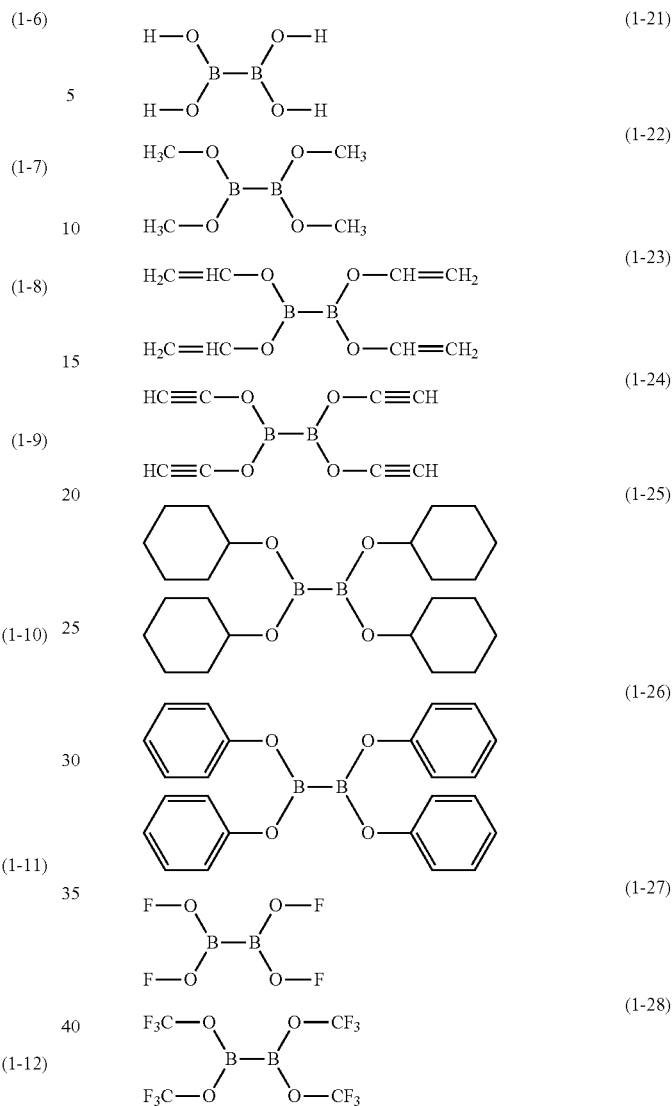

Hereinafter, the first boron compound and the second boron compound are collectively referred to as a "boron compound".

In addition, the boron compound may be an additional compound other than the above-described compounds as long as the compound has a boron and oxygen containing structure.

For example, the additional compound is a compound obtained by partially combining the first boron compound and the second boron compound. More specific examples of the additional compound include a compound obtained by combining a left portion of the first boron compound which forms a ring and a right portion of the second boron compound which does not form a ring, and the like.

Furthermore, examples of the additional compound include a compound obtained by partially combining the specific examples of the above-described second boron compound. More specific examples of the additional compound include a compound in which a left portion is a five-membered ring and a right portion is a six-membered ring, and the like.

An amount of the boron compound in the electrolyte solution is not particularly limited, but it is preferable that the amount is 0.01% by weight to 3% by weight. This is because a high battery capacity is retained, and a decomposition reaction of the electrolyte solution is suppressed.

In addition, the electrolyte solution may include any one kind or two or more kinds of additional materials in addition to the above-described boron compound.

Additional Materials: Solvent

Addition materials are any one kind or two or more kinds among solvents including a nonaqueous solvent.

Examples of the solvents include cyclic carbonic acid ester, chain carbonic acid ester, lactone, chain carboxylic acid ester, nitrile, and the like. This is because excellent solubility, compatibility, and the like can be obtained. Examples of the cyclic carbonic acid ester include ethylene carbonate, propylene carbonate, butylene carbonate, and the like. Examples of the chin carbonic acid ester include dimethyl carbonate, diethyl carbonate, ethyl methyl carbonate, methyl propyl carbonate, and the like. Examples of the lactone include γ-butyrolactone, γ-valerolactone, and the like. Examples of the carboxylic acid ester include methyl acetate, ethyl acetate, methyl propionate, ethyl propionate, methyl butyrate, methyl isobutyrate, trimethyl methyl acetate, trimethyl ethyl acetate, and the like. Examples of the nitrile include acetonitrile, glutaronitrile, adiponitrile, methoxy acetonitrile, 3-methoxy propionitrile, and the like.

Furthermore, the examples of the solvents include 1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, N,N-dimethyl formamide, N-methyl-pyrrolidinone, N-methyl-oxazolidinone, N,N'-dimethylimidazolidinone, nitromethane, nitroethane, sulfolane, trimethyl phosphate, dimethyl sulfoxide, and the like. This is because the same advantage can be obtained.

Among these, any one kind or two or more kinds among ethylene carbonate, propylene carbonate, dimethyl carbonate, diethyl carbonate, and ethyl methyl carbonate are preferable. In this case, a combination of a high-viscosity (high-dielectric-constant) solvent (for example, specific dielectric constant ∈≥30) such as ethylene carbonate and propylene carbonate and a low-viscosity solvent (for example, visocosity≤1 mPa·s) such as dimethyl carbonate, ethyl methyl carbonate, and diethyl carbonate is more preferable. This is because in the electrolyte solution, dissociation of an electrolyte salt and ion mobility are improved.

In addition, the solvents may be any one kind or two or more kinds among unsaturated cyclic carbonic acid esters. This is because a stable protective film is formed on a surface of an electrode during charging and discharging, and thus the decomposition reaction of the electrolyte solution is suppressed.

Each of the unsaturated cyclic carbonic acid esters is cyclic carbonic acid ester having one or more unsaturated bonds (carbon-carbon double bonds), and more specific examples thereof include compounds which are expressed by Formula (4) to Formula (6), respectively. An amount of the unsaturated cyclic carbonic acid ester in the solvent is not particularly limited, and for example, the amount is 0.01% by weight to 10% by weight.

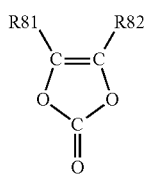

(4)

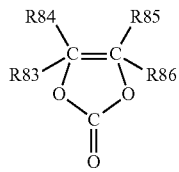

(5)

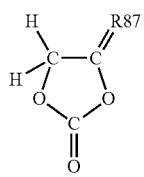

(6)

(provided that, each of R81 and R82 represents either a hydrogen group or an alkyl group. Each of R83 to R86 represents any one of a hydrogen group, an alkyl group, a vinyl group, and allyl group, and at least one of R83 to R86 represents either the vinyl group or the allyl group. R87 represents a group expressed >CR88R89, and each of R88 and R89 represents either the hydrogen group or the alkyl group.)

The compound expressed by Formula (4) is a vinylene carbonate based compound. R81 and R82 may be the same kind of group or may be different kinds of groups. Specific examples of the vinylene carbonate based compound include vinylene carbonate (1,3-dioxole-2-one), methylvinylene carbonate (4-methyl-1,3-dioxole-2-one), ethylvinylene carbonate (4-ethyl-1,3-dioxole-2-one), 4,5-dimethyl-1,3-dioxole-2-one, 4,5-diethyl-1,3-dioxole-2-one, 4-fluoro-1,3-dioxole-2,4-trifluoromethyl-1,3-dioxole-2-one, and the like. Among these, vinylene carbonate is preferable. This is because vinylene carbonate is easily available and a high effect can be obtained.

The compound expressed by Formula (5) is a vinyl ethylene carbonate based compound. R83 to R86 may be the same kind of groups or may be different kinds of groups. In addition, parts of R83 to R86 may be same kind of groups. Specific examples of the vinyl ethylene carbonate based compound include vinyl ethylene carbonate (4-vinyl-1,3-dioxolan-2-one), 4-methyl-4-vinyl-1,3-dioxolane-2-one, 4-ethyl-4-vinyl-1,3-dioxolane 2-one, 4-n-propyl-4-vinyl-1, 3-dioxolane-2-one, 5-methyl-4-vinyl-1,3-dioxolane-2-one, 4,4-divinyl-1, 3-dioxolane-2-one, 4,5-divinyl-1,3-dioxolane-2-one, and the like. Among these, the vinyl ethylene carbonate is preferable. This is because the vinyl ethylene carbonate is easily available, and a high effect can be obtained. In addition, all of R83 to R86 may be vinyl groups or allyl groups, and a vinyl group and an allyl group may be mixed-in with each other.

The compound expressed by Formula (6) is a methylene ethylene carbonate based compound. R88 and R89 may be the same kind of groups or may be different kinds of groups. Specific examples of the methylene ethylene carbonate based compound include methylene ethylene carbonate (4-methylene-1,3-dioxolane-2-one), 4,4-dimethyl-5-methylene-1,3-dioxolane-2-one, 4,4-diethyl-5-methylene-1,3-dioxolane-2-one, and the like. The methylene ethylene carbonate based compound may be a compound having two methylene groups in addition to a compound having one methylene group as shown in Formula (18).

In addition, the unsaturated cyclic carbonic acid esters may be catechol carbonate having a benzene ring, and the like.

In addition, the solvents may be any one kind or two or more kinds among halogenated carbonic acid esters. This is because a stable protective film is formed on a surface of an electrode during charging and discharging, and thus the decomposition reaction of the electrolyte solution is suppressed. The halogenated carbonic acid esters are carbonic acid esters including one or more halogens as a constituent element, and more specifically, the halogenated carbonic acid ester are compounds which are expressed by Formula (7) and Formula (8), respectively. An amount of the halogenated carbonic acid esters in a solvent is not particularly limited, and for example, the amount is 0.01% by weight to 50% by weight.

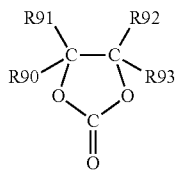
(7)

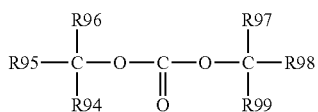
(8)

(provided that, each of R90 to R93 represents any one among a hydrogen group, a halogen group, an alkyl group, and a halogenated alkyl group. At least one of R90 to R93 represents either the halogen group or the halogenated alkyl group. R94 to R99 represents any one among a hydrogen group, a halogen group, an alkyl group, and a halogenated alkyl group, and at least one of R94 to R99 represents either the halogen group or the halogenated alkyl group.)

The compound expressed by Formula (7) is cyclic halogenated carbonic acid ester. R90 to R93 may be the same kind of groups, or may be different kinds of groups. In addition, parts of R90 to R93 may be the same kind of groups.

The kind of a halogen group is not particularly limited, but any one kind or two or more kinds among a fluorine group, a chlorine group, a bromine group, and an iodine group are preferable, and the fluorine group is more preferable. This is because the fluorine group easily forms the protective film in comparison to other halogen groups. In addition, the number of halogen groups is preferably one or two, and more preferably 3 or more. This is because capability of forming the protective film further increases, and the protective film becomes more strong.

The halogenated alkyl group represents a group in which one or more hydrogen groups in the alkyl group are substituted (halogenated) with the halogen group. Details of the halogen group are the same as described above.

Specific examples of the cyclic halogenated carbonic acid ester include compounds which are expressed by Formula (7-1) to Formula (7-21), and the like, and the compounds also include a geometrical isomer. Among these, 4-fluoro-1,3-dioxolane-2-one expressed by Formula (7-1), 4,5-difluoro-1,3-dioxolane-2-one expressed by Formula (7-3), and the like are preferable. In addition, as the 4,5-difluoro-1,3-dioxolane-2-one, a trans isomer is preferable in comparison to a cis isomer. This is because the cis isomer is easily available, and a high effect can be obtained.

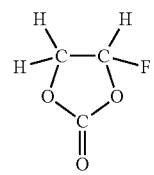
(7-1)

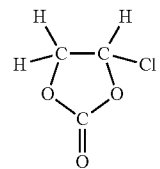
(7-2)

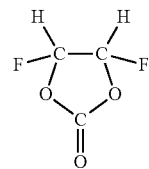
(7-3)

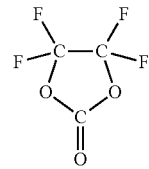
(7-4)

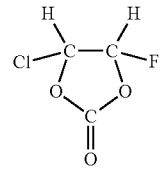
(7-5)

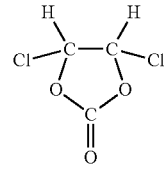
(7-6)

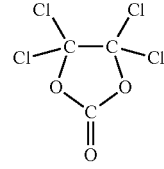
(7-7)

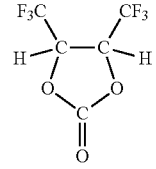
(7-8)

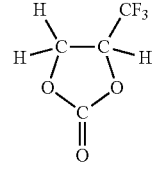
(7-9)

(7-10) 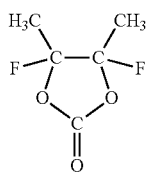

(7-11) 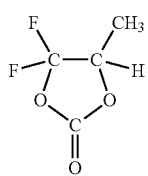

(7-12) 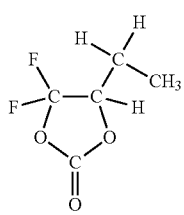

(7-13) 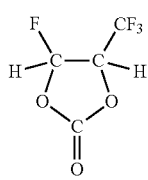

(7-14) 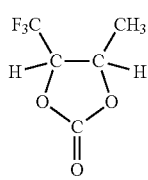

(7-15) 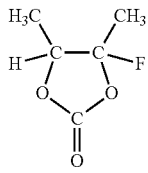

(7-16) 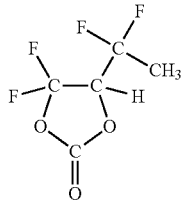

(7-17) 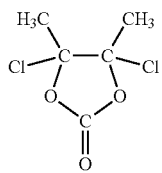

(7-18) 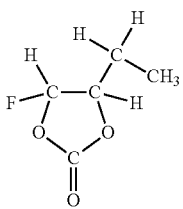

(7-19) 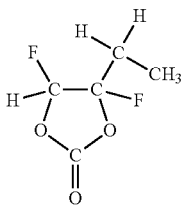

(7-20) 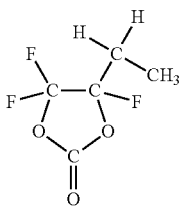

(7-21) 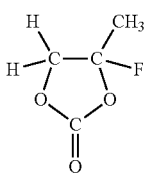

The compound expressed by Formula (8) is a chain halogenated carbonic acid ester. R94 to R99 may be the same kind of groups, or may be different kinds of groups. In addition, parts of R94 to R99 may be the same kind of groups.

Specific examples of the chain halogenated carbonic acid ester include fluoromethyl methyl carbonate, bis(fluoromethyl) carbonate, difluoromethyl methyl carbonate, and the like.

In addition, the solvent may be sulfonic acid ester. This is because chemical stability of the electrolyte solution is further improved. The sulfonic acid ester includes mono sulfonic acid ester and disulfonic acid ester.

The mono sulfonic acid ester may be cyclic monosufonic acid ester, or chain mono sulfonic acid ester. Examples of the cyclic mono sulfonic acid ester include sultone such as propane sultone and propene sultone. The chain mono sulfonic acid ester is ester in which the cyclic mono sulfonic acid ester is cut out partway therethrough. As an example, in a case where the propane sultone is cut out partway therethrough, the chain mono sulfonic acid ester is CH$_3$—CH$_2$—CH$_2$—SO$_3$—CH$_3$, and the like. A direction of —SO$_3$—(S(=O)$_2$—O—) is not particularly limited. That is, CH$_3$—CH$_2$—CH$_2$—SO$_3$—CH$_3$ may be CH$_3$—CH$_2$—CH$_2$—S(=O)$_2$—O—CH$_3$ or CH$_3$—CH$_2$—CH$_2$—O—S(=O)$_2$—CH$_3$.

The disulfonic acid ester may be cyclic disulfonic acid ester or chain disulfonic acid ester. Examples of the cyclic disulfonic acid ester include compounds which are expressed by Formula (9-1) to Formula (9-3), and the like. The chain disulfonic acid ester is ester in which the cyclic disulfonic ester is cut out partway therethrough. As an example, chain disulfonic acid ester in which the compound expressed by Formula (9-1) is cut out partway therethrough is $CH_3$—$SO_3$—$CH_2$—$CH_2$—$SO_3$—$CH_3$, and the like. A direction of —$SO_3$—(—$S(=O)_2$—$O$—) is not particularly limited. That is, $CH_3$—$SO_3$—$CH_2$—$CH_2$—$SO_3$—$CH_3$ may be $CH_3$—$S(=O)_2$—$O$—$CH_2$—$CH_2$—$S(=O)_2$—$O$—$CH_3$, $CH_3$—$O$—$S(=O)_2$—$CH_2$—$CH_2$—$S(=O)_2$—$O$—$CH_3$, or $CH_3$—$S(=O)_2$—$O$—$CH_2$—$CH_2$—$O$—$S(=O)_2$—$CH_3$.

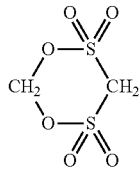

(9-1)

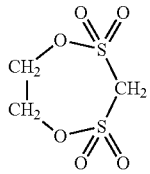

(9-2)

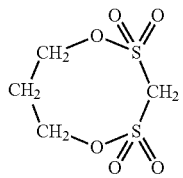

(9-3)

An amount of the sulfonic acid ester in the solvent is not particularly limited, and for example, the amount is 0.5% by weight to 5% by weight.

In addition, the solvent may be an acid anhydride. This is because the chemical stability of the electrolyte solution is further improved. Examples of the acid anhydride include a carboxylic acid anhydride, a disulfonic acid anhydride, a carboxylic acid/sulfonic acid anhydride, and the like. Examples of the carboxylic acid anhydride include a succinic acid anhydride, a glutaric acid anhydride, a maleic acid anhydride, and the like. Examples of the disulfonic acid anhydride include an ethane disulfonic acid anhydride, a propane disulfonic acid anhydride, and the like. Examples of the carboxylic acid/sulfonic acid anhydride include a sulfobenzoic acid anhydride, a sulfopropionic acid anhydride, a sulfobutyric acid anhydride, and the like. An amount of the acid anhydride in the solvent is not particularly limited, and for example, the amount is 0.5% by weight to 5% by weight.

Furthermore, the solvent may be a dicyano compound and a diisocyanate compound. This is because the chemical stability of the electrolyte solution is further improved. Examples of the dicyano compound include compounds which are expressed by NC—$C_mH_{2m}$—CN (m is an integer of 1 or greater), and specific examples thereof include NC—$C_2H_4$—CN, and the like. Examples of the diisocyanate compound include compounds which are expressed by OCN—$C_nH_{2n}$—NCO (n is an integer of 1 or greater), and specific examples thereof include OCN—$C_6H_{12}$—NCO, and the like. An amount of the dicyano compound in the solvent is not particularly limited, and for example, the amount is 0.5% by weight to 5% by weight. For example, the amount range is also true of the diisocyanate compound.

Additional Materials: Electrolyte Salt

In addition, examples of the additional materials include any one kind or two or more kinds among electrolyte salts including a lithium salt. However, for example, the electrolyte salt may include a salt other than the lithium salt. Examples of the salt other than the lithium salt include salts of light metals other than lithium.

Examples of the lithium salt include lithium hexafluorophosphate ($LiPF_6$), lithium tetrafluoroborate ($LiBF_4$), lithium perchlorate ($LiClO_4$), lithium hexafluoroarsenate ($LiAsF_6$), lithium tetraphenylborate ($LiB(C_6H_5)_4$), lithium methanesulfonate ($LiCH_3SO_3$), lithium trifluoromethanesulfonate ($LiCF_3SO_3$), lithium tetrachloroaluminate ($LiAlCl_4$), dilithium hexafluorosilicate ($Li_2SiF_6$), lithium chloride (LiCl), and lithium bromide (LiBr).

Among these, any one kind or two or more kinds among $LiPF_6$, $LiBF_4$, $LiClO_4$, and $LiAsF_6$ are preferable, and $LiPF_6$ is more preferable. This is because internal resistance decreases.

In addition, the electrolyte salt may be any one kind or two or more kinds among compounds which are expressed by Formula (10) to Formula (12), respectively. In addition, R41 and R43 may be the same kind of groups, or may be different kinds of groups. This is also true of R51 to R53, and R61 and R62.

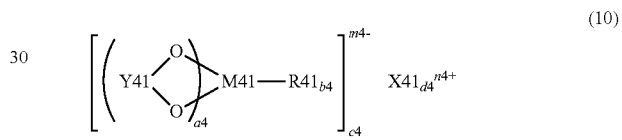

(10)

(provided that, X41 represents an element of Group 1, an element of Group 2, or Al in a long periodic table. M41 represents a transition metal, or an element of Group 13, an element or Group 14, or an element of Group 15 in the long periodic table. R41 represents a halogen group. Y41 is —C(=O)—R42-C(=O)—, —C(=O)—$CR43_2$-, or —C(=O)—C(=O)—. In addition, R42 represents an alkylene group, a halogenated alkylene group, an arylene group, or a halogenated arylene group. R43 represents an alkyl group, a halogenated alkyl group, an aryl group, or a halogenated aryl group. In addition, a4 represents an integer of 1 to 4, b4 represents an integer of 0, 2, or 4, and c4, d4, m4, and n4 represent integers of 1 to 3.)

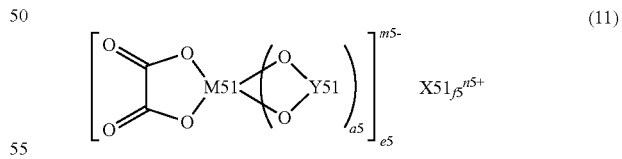

(11)

(provided that, X51 represents an element of an element of Group 1 or an element of Group 2 in the long periodic table. M51 represents a transition metal, or an element of Group 13, an element of Group 14, or an element of Group 15 in the long periodic table. Y51 represents —C(=O)—($CR51_2$)$_{b5}$-C(=O)—, —$R53_2$C—($CR52_2$)$_{c5}$-C(=O)—, —$R53_2$C—($CR52_2$)$_{c5}$-$CR53_2$—, —$R53_2$C—($CR52_2$)$_{c5}$-S(=O)$_2$—, —S(=O)$_2$—($CR52_2$)$_{d5}$-S(=O)$_2$—, or —C(=O)—($CR52_2$)$_{d5}$-S(=O)$_2$—. In addition, each of R51 and R53 represents a hydrogen group, an alkyl group, a halogen group, or a halogenated alkyl group. At least one of R51 and R53 is the halogen group or the halogenated alkyl group. R52 represents a hydrogen group, an alkyl group, a halogen group, or a halogenated alkyl group. In addition, a5, e5, and n5 are integers of 1 or 2, b5 and d5 are integers of 1 to 4, c5 is an integer of 0 to 4, and f5 and m5 are integers of 1 to 3.)

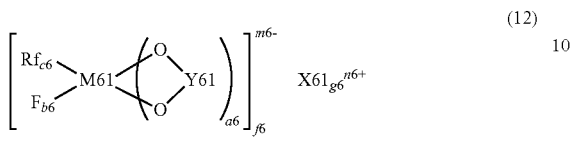
(12)

(provided that, X61 represents an element of Group 1 or an element of Group 2 in the long periodic table. M61 represents a transition metal, or an element of Group 13, an element of Group 14, or an element of Group 15 in the long periodic table. Rf represents a fluorinated alkyl group or a fluorinated aryl group, and the number of carbons thereof is 1 to 10. Y61 represents —C(=O)—(CR61$_2$)$_{d6}$-C(=O)—, —R62$_2$C—(CR61$_2$)$_{d6}$-C(=O)—, —R62$_2$C—(CR61$_2$)$_{d6}$-CR62$_2$-, —R62$_2$C—(CR61$_2$)$_{d6}$-S(=O)$_2$—, —S(=O)$_2$—(CR61$_2$)$_{e6}$-S(=O)$_2$—, or —C(=O)—(CR61$_2$)$_{e6}$-S(=O)$_2$—. In addition, R61 represents a hydrogen group, an alkyl group, a halogen group, or a halogenated alkyl group. R62 represents a hydrogen group, an alkyl group, a halogenated group, or a halogenated alkyl group, and at least one among these is the halogen group or the halogenated alkyl group. In addition, a6, f6, and n6 are integers of 1 or 2, b6, c6 and e6 are integers of 1 to 4, d6 is an integer of 0 to 4, and g6 and m6 are integers of 1 to 3.)

In addition, the element of Group 1 represents hydrogen (H), lithium (Li), sodium (Na), potassium (K), rubidium (Rb), cesium (Cs), or francium (Fr). The element of Group 2 represents beryllium (Be), magnesium (Mg), calcium (Ca), strontium (Sr), barium (Ba), or radium (Ra). The element of Group 13 represents boron (B), aluminum (Al), gallium (Ga), indium (In), or thallium (Tl). The element of Group 14 represents carbon (C), silicon (Si), germanium (Ge), tin (Sn), or lead (Pb). The element of Group 15 represents nitrogen (N), phosphorus (P), arsenic (As), antimony (Sb), or bismuth (Bi).

Specific examples of the compound expressed by Formula (10) include compounds which are expressed by Formula (10-1) to Formula (10-6), and the like. Specific examples of the compound expressed by Formula (11) include compounds which are expressed by Formula (11-1) to Formula (11-8), and the like. Specific examples of the compound expressed by Formula (12) include a compound which is expressed by Formula (12-1), and the like. In addition, specific examples of the compounds which are expressed by Formula (10) to Formula (12) may be other compounds.

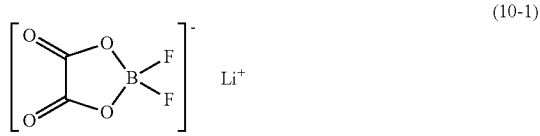
(10-1)

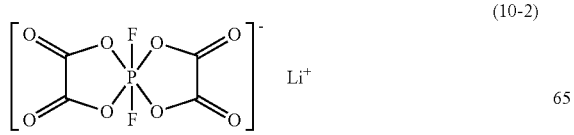
(10-2)

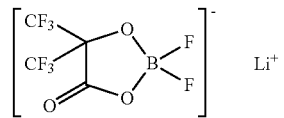
(10-3)

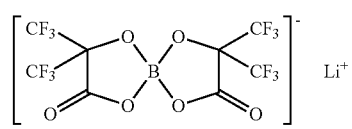
(10-4)

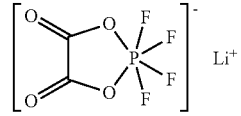
(10-5)

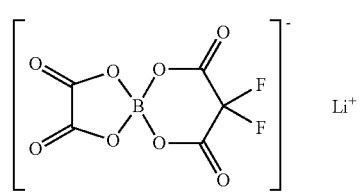
(10-6)

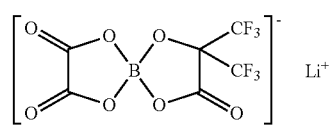
(11-1)

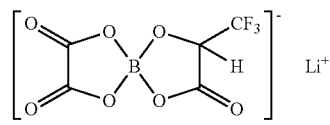
(11-2)

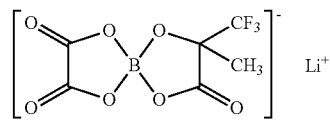
(11-3)

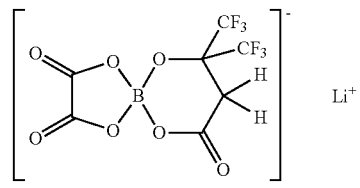
(11-4)

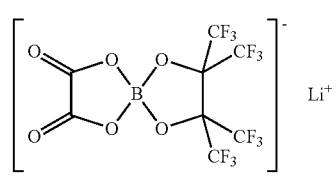
(11-5)

(11-6)

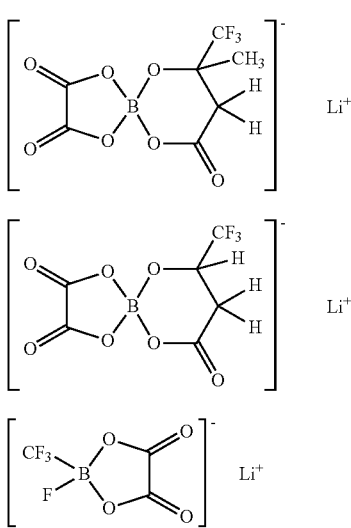 (11-7)

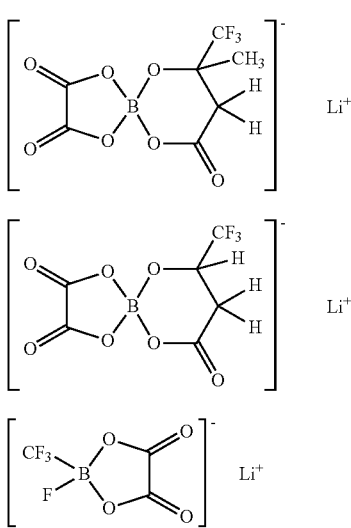 (11-8)

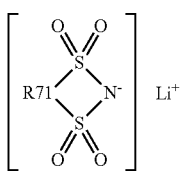 (12-1)

In addition, the electrolyte salts may be compounds which are expressed by Formula (13) to Formula (15), respectively. In addition, m and n may be the same value, or may be values different from each other. This is also true of p, q, and r.

$$LiN(C_mF_{2m+1}SO_2)(C_nF_{2n+1}SO_2) \quad (13)$$

(provided that, m and n represent integers of 1 or greater.)

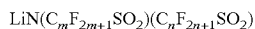 (14)

(provided that, R71 represents a straight chain shaped or diverged perfluoroaklylene group having 2 to 4 carbons.)

$$LiC(C_pF_{2p+1}SO_2)(C_qF_{2q+1}SO_2)(C_rF_{2r+1}SO_2) \quad (15)$$

(provided that, p, q, and r represent an integer of 1 or greater.)

The compound expressed by Formula (13) is a chain imide compound. Specific examples of the chain imide compound include lithium bis(trifluoromethanesulfonyl)imide (LiN(CF$_3$SO$_2$)$_2$), lithium bis(pentafluoroethanesulfonyl)imide (LiN(C$_2$F$_5$SO$_2$)$_2$), lithium (trifluoromethanesulfonyl)(pentafluoroethanesulfonyl)imide (LiN(CF$_3$SO$_2$)(C$_2$F$_5$SO$_2$)), lithium (trifluoromethanesulfonyl)(heptafluoropropanesulfonyl)imide (LiN(CF$_3$SO$_2$)(C$_3$F$_7$SO$_2$)), lithium (trifluoromethanesulfonyl)(nonafluorobutanesulfonyl)imide (LiN(CF$_3$SO$_2$)(C$_4$F$_9$SO$_2$)), and the like. In addition, specific examples of the chain imide compound may include other compounds.

The compound expressed by Formula (14) is a cyclic imide compound. Specific examples of the cyclic imide compound include compounds which are expressed by Formula (14-1) to (14-4), and the like. In addition, specific examples of the cyclic imide compound may include other compounds.

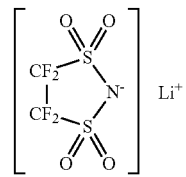 (14-1)

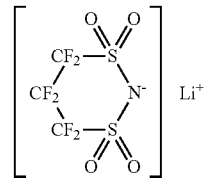 (14-2)

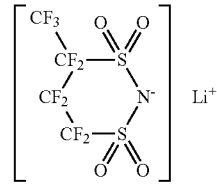 (14-3)

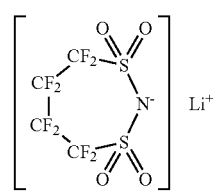 (14-4)

The compound expressed by Formula (15) is a chain methide compound. Specific examples of the chain methide compound include lithium tris(trifluoromethanesulfonyl) methide (LiC(CF$_3$SO$_2$)$_3$), and the like. In addition, specific examples of the chain methide compound may include other compounds.

An amount of the electrolyte salt is not particularly limited, but it is preferable that the amount is 0.3 mol/kg to 3.0 mol/kg with respect to the solvent. This is because high ion conductivity can be obtained.

Additional Materials: Other Additives

Furthermore, additional materials may be any one kind or two or more kinds of materials other than the above-described materials. For example, the additives are phosphorus and fluorine containing salts such as LiPF$_2$O$_2$ and Li$_2$PFO$_3$. An amount of the additives in the electrolyte solution is not particularly limited.

Operation and Effect of Electrolyte solution

According to the electrolyte solution, the boron compound having the boron and oxygen containing structure is included. In this case, in comparison to a case where the electrolyte solution does not include the boron compound and a case where the electrolyte solution includes an additional boron compound, the chemical stability of the electrolyte solution is improved, and thus the decomposition reaction of the electrolyte solution is suppressed during charging and discharging. Accordingly, discharging capacity is less likely to decrease even when undergoing charging and discharging, and thus excellent battery characteristics can be obtained.

Particularly, when the boron compound includes any one kind of or two or more kinds of the compounds which are expressed by Formula (2), Formula (2-1), Formula (2-2), and Formula (3), it is possible to obtain a higher effect. In addition, when the amount of the boron compound in the electrolyte solution is 0.01% by weight to 3% by weight, it is possible to obtain a higher effect.

Here, examples of the additional boron compound as described above include the compounds which are expressed by Formula (16-1) to Formula (16-3), and the like. Other boron compounds described here do not have the boron and oxygen containing structure.

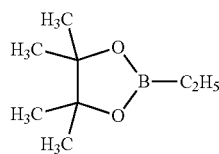
(16-1)

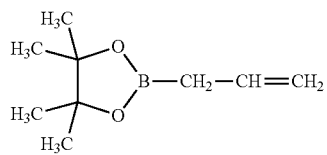
(16-2)

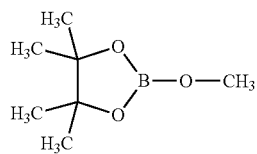
(16-3)

2. Secondary Battery

Next, a secondary battery using the above-described electrolyte solution will be described.

2-1. Lithium Ion Secondary Battery

For example, the secondary battery stated here is a lithium secondary battery (lithium ion secondary battery) capable of obtaining a capacity of a negative electrode 22 through intercalation and deintercalation of lithium (lithium ion) that is an electrode reaction material.

2-1-1. Cylindrical Type

Figure 2:
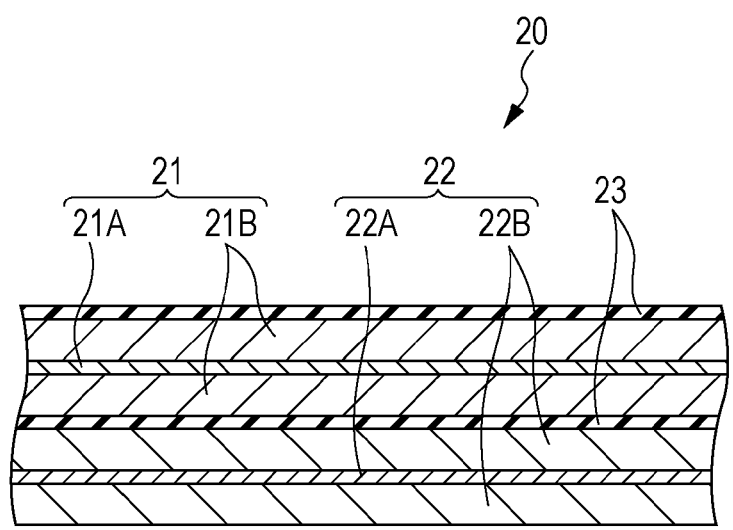
FIG. 2 is an enlarged cross-sectional view illustrating a part of a wound electrode body illustrated in FIG. 1.

FIGS. 1 and 2 illustrate a cross-sectional configuration of the secondary battery according to an embodiment of the present disclosure. In FIG. 2, a part of a wound electrode body 20 illustrated in FIG. 1 is illustrated in an enlarged manner.

Overall Configuration of Secondary Battery

For example, the secondary battery is a so-called cylindrical type secondary battery, and the wound electrode body 20 and a pair of insulating plates 12 and 13 are accommodated inside an approximately hollow cylindrical battery casing 11. For example, the wound electrode body 20 is configured in such a manner that a positive electrode 21 and a negative electrode 22 are laminated through a separator 23 and are wound.

The battery casing 11 has a hollow structure in which one end is closed and the other end is opened, and is formed from, for example, any one kind or two or more kinds of materials among iron (Fe), aluminum (Al), and an alloy thereof. A surface of the battery casing 11 may be plated with nickel (Ni) and the like. The pair of insulating plates 12 and 13 is disposed to extend in a direction perpendicular to a winding peripheral surface with the wound electrode body 20 interposed between the pair of insulating plates 12 and 13.

At an opened end of the battery casing 11, a battery cover 14, a safety valve mechanism 15, and a heat-sensitive resistance element (PTC element) 16 are caulked through a gasket 17, and thus the battery casing 11 is hermetically closed. For example, the battery cover 14 is formed from the same material as the battery casing 11. All of the safety valve mechanism 15 and the heat-sensitive resistance element 16 are provided on an inner side of the battery cover 14, and the safety valve mechanism 15 is electrically connected to the battery cover 14 through the heat-sensitive resistance element 16. In the safety valve mechanism 15, when an inner pressure reaches a constant value or higher due to inner short-circuiting, heating from the outside, and the like, a disc plate 15A is inverted. According to this, electrical connection between the battery cover 14 and the wound electrode body 20 is cut off. To prevent abnormal heat generation that is caused by a large current, resistance of the heat-sensitive resistance element 16 increases in response to an increase in temperature. For example, the gasket 17 is formed from an insulating material, and a surface of the gasket 17 may be coated with asphalt, and the like.

For example, a center pin 24 is inserted into the center of the wound electrode body 20. However, the center pin 24 may not be inserted into the center of the wound electrode body 20. A positive electrode lead 25, which is formed from, for example, a conductive material such as aluminum, is connected to the positive electrode 21, and a negative electrode lead 26, which is formed from, for example, a conductive material such as nickel, is connected to the negative electrode 22. For example, the positive electrode lead 25 is welded to the safety valve mechanism 15, and is electrically connected to the battery cover 14. For example, the negative electrode lead 26 is welded to the battery casing 11, and is electrically connected to the battery casing 11.

Positive Electrode

The positive electrode 21 includes a positive electrode active material layer 21B on one surface or both surfaces of a positive electrode current collector 21A. For example, the positive electrode current collector 21A is formed from a conductive material such as aluminum, nickel, and stainless steel.

The positive electrode active material layer 21B includes any one kind or two or more kinds of positive electrode materials, which are capable of intercalating and deintercalating lithium ions, as a positive electrode active material. In addition, the positive electrode active material layer 21B may further include any one kind or two or more kinds of additional materials such as a positive electrode binding agent and a positive electrode conductive agent.

It is preferable the positive electrode material is a lithium-containing compound. More specifically, it is preferable that the positive electrode material is any one or both of a lithium-containing composite oxide and a lithium-containing phosphoric acid compound. This is because a high energy density can be obtained.

The "lithium-containing composite oxide" is an oxide that includes lithium and one or more elements (hereinafter, referred to as "other elements" excluding lithium (Li)) as a constituent element, and has a layered rock salt type crystal structure or a spinel type crystal structure. The "lithium-containing phosphoric compound" is a phosphoric acid compound including lithium and one or more other elements as a constituent element, and has an olivine type crystal structure.

The kind of other elements is not particularly limited as long as other elements are any one kind or two or more kinds of arbitrary elements. Among these, it is preferable that other elements are any one kind or two or more kinds of elements among elements which belong to Group 2 to Group 15 in a long-periodic table. More specifically, it is more preferable that other elements are any one kind or two or more kinds of metal elements among nickel (Ni), cobalt (Co), manganese (Mn), and iron (Fe). This is because a high voltage can be obtained.

Among these, it is preferable that the lithium-containing composite oxide which has a layered rock salt type crystal structure is any one kind or two or more kinds of compounds expressed by Formula (21) to Formula (23).

$$Li_aMn_{(1-b-c)}Ni_bM11_cO_{(2-d)}Fe \quad (21)$$

(provided that, M11 represents at least one kind of element among cobalt (Co), magnesium (Mg), aluminum (Al), boron (B), titanium (Ti), vanadium (V), chromium (Cr), iron (Fe), copper (Cu), zinc (Zn), zirconium (Zr), molybdenum (Mo), tin (Sn), calcium (Ca), strontium (Sr), and tungsten (W). a to e satisfy relationships of $0.8 \le a \le 1.2$, $0<b<0.5$, $0 \le c \le 0.5$, $(b+c) < -0.1 \le d \le 0.2$, and $0 \le e \le 0.1$. In addition, a composition of lithium is different in accordance with a charging and discharging state, and a is a value in a completely discharged state.)

$$Li_aNi_{(1-b)}M12_bO_{(2-c)}F_d \quad (22)$$

(provided that, M12 represents at least one kind of element among cobalt (Co), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W). a to d satisfy relationships of $0.8 \le a \le 1.2$, $0.005 \le b \le 0.5$, $-0.1 \le c \le 0.2$, and $0 \le d \le 0.1$. In addition, a composition of lithium is different in accordance with a charging and discharging state, and a is a value in a completely discharged state.)

$$Li_aCo_{(1-b)}M13_bO_{(2-c)}F_d \quad (23)$$

(provided that, M13 represents at least one kind of element among nickel (Ni), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W). a to d satisfy relationships of $0.8 \le a \le 1.2$, $0 \le b < 0.5$, $-0.1 \le c \le 0.2$, and $0 \le d \le 0.1$. In addition, a composition of lithium is different in accordance with a charging and discharging state, and a is a value in a completely discharged state.)

Specific examples of the lithium-containing composite oxide having a layered rock salt type crystal structure include $LiNiO_2$, $LiCoO_2$, $LiCo_{0.98}Al_{0.01}Mg_{0.01}O_2$, $LiNi_{0.5}Co_{0.2}Mn_{0.3}O_2$, $LiNi_{0.8}Co_{0.15}Al_{0.05}O_2$, $LiNi_{0.33}Co_{0.33}Mn_{0.33}O_2$, $Li_{1.2}Mn_{0.52}Co_{0.175}Ni_{0.1}O_2$, $Li_{1.15}(Mn_{0.65}Ni_{0.22}CO_{0.13})O_2$, and the like.

It is preferable that the lithium-containing composite oxide having the spinel type crystal structure is any one kind or two or more kinds of compounds which are expressed by Formula (24).

$$Li_aMn_{(2-b)}M14_bO_cF_d \quad (24)$$

(provided that, M14 represents at least one kind of element among cobalt (Co), nickel (Ni), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W). a to d satisfy relationships of $0.9 \le a \le 1.1$, $0 \le b \le 0.6$, $3.7 \le c \le 4.1$, $0 \le d \le 0.1$. In addition, a composition of lithium is different in accordance with a charging and discharging state, and a is a value in a completely discharged state.)

Specific examples of the lithium-containing composite oxide having the spinel type crystal structure include $LiMn_2O_4$, and the like.

It is preferable that the lithium-containing phosphoric acid compound having the olivine type crystal structure is any one kind or two or more kinds of compounds among compounds expressed by Formula (25).

$$Li_aM15PO_4 \quad (25)$$

(provided that, M15 represents at least one kind of element among cobalt (Co), manganese (Mn), iron (Fe), nickel (Ni), magnesium (Mg), aluminum (Al), boron (B), titanium (Ti), vanadium (V), niobium (Nb), copper (Cu), zinc (Zn), molybdenum (Mo), calcium (Ca), strontium (Sr), tungsten (W), and zirconium (Zr). a satisfies a relationship of $0.9 \le a \le 1.1$. In addition, a composition of lithium is different in accordance with a charging and discharging state, and a is a value in a completely discharged state.)

Specific examples of the lithium-containing phosphoric acid compounds having the olivine type crystal structure include $LiFePO_4$, $LiMnPO_4$, $LiFe_{0.5}Mn_{0.5}PO_4$, $LiFe_{0.3}Mn_{0.7}PO_4$, and the like.

In addition, the lithium-containing composite oxide may be one kind or two or more kinds of compounds among compounds expressed by Formula (26).

$$(Li_2MnO_3)_x(LiMnO_2)_{1-x} \quad (26)$$

(provided that, x satisfies a relationship of $0 \le x \le 1$. In addition, a composition of lithium is different in accordance with a charging and discharging state, and x is a value in a completely discharged state.)

In addition, for example, the positive electrode material may be one kind or two or more kinds of materials among an oxide, a disulfide, a chalcogenide, a conductive polymer, and the like. Examples of the oxide include titanium oxide, vanadium oxide, manganese dioxide, and the like. Examples of the disulfide include titanium disulfide, molybdenum sulfide, and the like. Examples of the chalcogenide include niobium selenide, and the like. Examples of the conductive polymer include sulfur, polyaniline, polythiophene, and the like. In addition, the positive electrode material may be a material other than the above-described materials.

For example, the positive electrode binding agent includes any one kind or two or more kinds among a synthetic rubber, a polymeric material, and the like. Examples of the synthetic rubber include a styrene-butadiene rubber, a fluorine rubber, an ethylene-propylene-diene rubber, and the like. Examples of the polymeric material include polyvinylidene fluoride, polyimide, and the like.

For example, the positive electrode conductive agent may include any one kind or two or more kinds of materials among carbon materials and the like. Examples of the carbon material include graphite, carbon black, acetylene black, ketjen black, and the like. In addition, the positive electrode conductive agent may be a metal material, a conductive polymer, and the like as long as these materials have conductivity.

Negative Electrode

The negative electrode 22 includes a negative electrode active material layer 22B on one surface or both surfaces of a negative electrode current collector 22A.

For example, the negative electrode current collector 22A is formed from a conductive material such as copper, nickel, and stainless steel. It is preferable that a surface of the negative electrode current collector 22A is roughened. This is because adhesiveness of the negative electrode active material layer 22B with respect to the negative electrode current collector 22A is improved due to a so-called anchor effect. In this case, the surface of the negative electrode current collector 22A may be roughened at least in a region that faces the negative electrode active material layer 22B. Examples of a roughening method include a method of forming particulates by using an electrolytic treatment. The electrolytic treatment is a method of forming particulates on the surface of the negative electrode current collector 22A in an electrolytic bath by using an electrolytic method, thereby providing irregularity in the surface of the negative electrode current collector 22A. Copper foil, which is prepared by the electrolytic method, is generally referred to as electrolytic copper foil.

The negative electrode active material layer 22B includes any one kind or two or more kinds of negative electrode materials capable of intercalating and deintercalating an electrode reaction material as a negative electrode active material. In addition, the negative electrode active material layer 22B may further include any one kind or two or more kinds of additional materials among a negative electrode binding agent, a negative electrode conductive agent, and the like. In addition, details regarding the negative electrode binding agent and the negative electrode conductive agent are the same as the details, for example, regarding the positive electrode binding agent and the positive electrode conductive agent.

In addition, it is preferable that a chargeable capacity of the negative electrode material is larger than a discharging capacity of the positive electrode 21 so as to prevent unintentional precipitation of the electrode reaction material to the negative electrode 22 during charging. That is, it is preferable that an electrochemical equivalent of the negative electrode material capable of intercalating and deintercalating the electrode reaction material is larger than an electrochemical equivalent of the positive electrode 21. In addition, for example, in a case where the electrode reaction material is lithium, the electrode reaction material that precipitates to the negative electrode 22 is a lithium metal.

For example, the negative electrode material is any one kind or two or more kinds of carbon materials. This is because a variation in a crystal structure during intercalation and deintercalation of the electrode reaction material is very small, and thus a high energy density can be stably obtained. In addition, the carbon material also functions as a negative electrode conductive agent, and thus conductivity of the negative electrode active material layer 22B is improved.

Examples of the carbon material include easily-graphitizable carbon, hardly-graphitizable carbon, graphite, and the like. In addition, an interplanar spacing of (002) planes in the hardly-graphitizable carbon is preferably 0.37 nm or greater, and an interplanar spacing of (002) planes in the graphite is preferably 0.34 nm or less. More specifically, examples of the carbon material include pyrolytic carbons, cokes, glass-like carbons, an organic polymeric compound fired body, activated charcoal, carbon blacks, and the like. The cokes include pitch coke, needle coke, and petroleum coke, and the like. The organic polymeric compound fired body is obtained by firing (carbonizing) a polymeric compound such as a phenol resin, a furan resin, and the like at an appropriate temperature. In addition, the carbon material may be low-crystallinity carbon that is subjected to a heat treatment at a temperature of approximately 1000° C. or lower, or may be amorphous carbon. In addition, the shape of the carbon material may be any one of a fibrous shape, a spherical shape, a granular shape, and a squamous shape.

In addition, for example, the negative electrode material is a material (metal-based material) that includes any one kind or two or more kinds of metal elements and metalloid elements as a constituent element. This is because a high energy density can be obtained.

The metal-based material may be any one of an elementary substance, an alloy, and a compound, two or more kinds thereof, and a material including one or more kinds of phases thereof at least at a part. In addition, the alloy also includes a material including one or more kinds of metal elements and one or more kinds of metalloid elements in addition to a material configured of two or more kinds of metal elements. In addition, the alloy may include a non-metal element. Examples of a structure of the metal-based material include solid-solution, an eutectic (eutectic mixture), an intermetallic compound, a coexistent material of two or more kinds thereof, and the like.

For example, the metal element and the metalloid element are any one kind or two or more kinds of metal elements and metalloid elements which are capable of forming an alloy with the electrode reaction material, and specific examples thereof include magnesium, boron, aluminum, gallium, indium (In), silicon, germanium (Ge), tin, lead (Pb), bismuth (Bi), cadmium (Cd), silver (Ag), zinc, hafnium (Hf), zirconium, yttrium (Y), palladium (Pd), platinum (Pt), and the like.

Among these, one or both of silicon and tin are preferable. This is because capability of intercalating and deintercalating the electrode reaction material is excellent, and thus a significantly high energy density can be obtained.

The material that includes one or both of silicon and tin as a constituent element may be any one of an elementary substance, an alloy, and a compound of silicon, any one of an elementary substance, an alloy, and a compound of tin, two or more kinds thereof, or a material that includes one or more kinds of phases thereof at least at a part. In addition, the elementary substance represents an elementary substance in general meaning (the elementary substance may include a slight amount of impurities), and does not mean purity of 100%.

For example, the silicon alloy includes any one kind or two or more kinds of elements among tin, nickel, copper, iron, cobalt, manganese, zinc, indium, silver, titanium, germanium, bismuth, antimony, chromium, and the like as a constituent element other than silicon. For example, the silicon compound includes any one kind or two or more kinds of elements among carbon, oxygen, and the like as a constituent element other than silicon. For example, the silicon compound may include any one kind or two or more kinds of elements among a series of the elements which are described with respect to the silicon alloy as a constituent element other than silicon.

Specific examples of the silicon alloy and the silicon compound include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, $SiC$, $Si_3N_4$, $Si_2N_2O$, $SiO_v$ ($0<v\leq2$), $LiSiO$, and the like. In addition, v in $SiO_v$ may satisfy a relationship of $0.2<v<1.4$.

For example, the tin alloy includes any one kind or two or more kinds of elements among silicon, nickel, copper, iron, cobalt, manganese, zinc, indium, silver, titanium, germanium, bismuth, antimony, chromium, and the like as a constituent element other than tin. For example, the tin compound includes any one kind or two or more kinds of elements among carbon, oxygen, and the like as a constituent element other than tin. In addition, for example, the tin compound may include any one kind or two or more kinds of elements among a series of the elements which are described with respect to the tin alloy as a constituent element other than tin.

Specific examples of the tin alloy and the tin compound include $SnO_w$ ($0<w≤2$), $SnSiO_3$, $LiSnO$, $Mg_2Sn$, and the like.

Particularly, it is preferable that the material that includes tin as a constituent element is, for example, a material (Sn-containing material) that includes tin (first constituent element), and second and third constituent elements as a constituent element. For example, the second constituent element includes any one kind or two or more kinds of elements among cobalt, iron, magnesium, titanium, vanadium, chromium, manganese, nickel, copper, zinc, gallium, zirconium, niobium, molybdenum, silver, indium, cesium (Ce), hafnium (Hf), tantalum, tungsten, bismuth, silicon, and the like. For example, the third constituent element includes any one kind or two or more kinds of elements among boron, carbon, aluminum, phosphorous (P), and the like. This is because when the Sn-containing material includes the second and third constituent elements, a high battery capacity, excellent cycle characteristics, and the like can be obtained.

Among these, it is preferable that the Sn-containing material is a material (SnCoC-containing material) that includes tin, cobalt, and carbon as a constituent element. For example, in the SnCoC-containing material, an amount of carbon is 9.9% by mass to 29.7% by mass, and a ratio between amounts of tin and cobalt (Co/(Sn+Co)) is 20% by mass to 70% by mass. This is because a high energy density can be obtained.

It is preferable that the SnCoC-containing material has a phase including tin, cobalt, and carbon, and the phase is a low-crystallinity phase or an amorphous phase. This is because the phase is a reaction phase capable of reacting with the electrode reaction material, and thus excellent characteristics can be obtained due to existence of the reaction phase. A full width at half maximum (diffraction angle $2\theta$) of a diffraction peak, which can be obtained by X-ray diffraction of the reaction phase, is preferably 1° or greater in a case where a CuKα-ray is used as a characteristic X-ray and a sweep rate is set to 1°/min. This is because the electrode reaction material is more smoothly intercalated and deintercalated, and reactivity with the electrolyte solution is reduced. In addition, the SnCoC-containing material may include a phase in which an elementary substance of each constituent element or a part thereof in addition to the low-crystallinity phase or the amorphous phase.

When comparing X-ray diffraction charts before and after an electrochemical reaction with the electrode reaction material, it is possible to easily determine whether or not a diffraction peak that can be obtained by the X-ray diffraction corresponds to a reaction phase capable of reacting with the electrode reaction material. For example, when a position of the diffraction peak varies before and after the electrochemical reaction with the electrode reaction material, it can be said that the diffraction peak corresponds to the reaction phase capable of reacting with the electrode reaction material. In this case, for example, the diffraction peak of the low-crystallinity or amorphous reaction phase is shown in a range of $2\theta=20°$ to $50°$. For example, it is considered that the reaction phase includes the above-described constituent elements, and thus amorphization or low-crystallization of the reaction phase occurs mainly due to existence of carbon.

In the SnCoC-containing material, it is preferable that at least a part of carbons which are constituent elements are bonded to a metal element or a metalloid element which is another constituent element. This is because aggregation or crystallization of tin and the like is suppressed. A bonding state of elements can be confirmed by using, for example, an X-ray photoelectron spectroscopy (XPS). In a commercially available apparatus, for example, an Al—Kα ray, Mg-Kα ray, and the like are used as a soft X-ray. In a case where at least a part of carbons are bonded to a metal element or a metalloid element, a peak of a synthetic wave of 1s orbit (C1s) of carbon is shown in a region lower than 284.5 eV. In addition, it is assumed that a peak of 4f orbit (Au4f) of a metal element is subjected to energy calibration so as to be obtained at 84.0 eV. At this time, a surface contamination carbon typically exists on a material surface, and thus the peak of C1s of the surface contamination carbon is set to 284.8 eV, and the peak is set to energy reference. In XPS measurement, a waveform of the peak of C1s can be obtained in a type including the peak of the surface contamination carbon and the peak of carbon in the SnCoC-containing material. Therefore, for example, both of the peaks are separated by analysis using commercially available software. During analysis of the waveform, a position of a main peak that exists on a minimum binding energy side is set as an energy reference (284.8 eV).

The SnCoC-containing material is not limited to a material (SnCoC) in which only tin, cobalt, and carbon are included as a constituent element. For example, the SnCoC-containing material may include any one kind or two or more kinds of elements among silicon, iron, nickel, chromium, indium, niobium, germanium, titanium, molybdenum, aluminum, phosphorus, gallium, bismuth, and the like as a constituent element in addition to tin, cobalt, and carbon.

In addition to the SnCoC-containing material, a material (SnCoFeC-containing material) that includes tin, cobalt, iron, and carbon as a constituent element is also preferable. The composition of the SnCoFeC-containing material is arbitrary. As an example, in a case where an amount of iron is set to be slightly small, an amount of carbon is 9.9% by mass to 29.7% by mass, an amount of iron is 0.3% by mass to 5.9% by mass, and a ratio (Co/(Sn+Co)) of amounts of tin and cobalt is 30% by mass to 70% by mass. In addition, in a case where the amount of iron is set to be slightly large, the amount of carbon is 11.9% by mass to 29.7% by mass, a ratio ((Co+Fe)/(Sn+Co+Fe)) of amounts of tin, cobalt, and iron is 26.4% by mass to 48.5% by mass, and a ratio (Co/(Co+Fe)) of amounts of cobalt and iron is 9.9% by mass to 79.5% by mass. This is because, in the composition ranges, a high energy density can be obtained. In addition, physical properties (a full width at half maximum, and the like) of the SnCoFeC-containing material are the same as those of the SnCoC-containing material.

In addition, for example, the negative electrode material may be any one kind or two or more kinds among a metal oxide, a polymeric compound, and the like. Examples of the metal oxide include iron oxide, ruthenium oxide, molybdenum oxide, and the like. Examples of the polymeric compound include polyacetylene, polyaniline, polypyrrole, and the like.

Among these, it is preferable that the negative electrode material includes both of the carbon material and the metal-based material in consideration of the following reasons.

A material, which includes the metal-based material, particularly, one or both of silicon and tin as a constituent element, has an advantage that a theoretical capacity is high, but has a concern that the material tends to actively expand and contract during an electrode reaction. On the other hand, the carbon material has a concern that the theoretical capacity is low, but has an advantage that the material less likely tends to expand and contract during the electrode reaction. Accordingly, when both of the carbon material and the metal-based material are used, expansion and contraction during the electrode reaction are suppressed while obtaining a high theoretical capacity (in order words, a battery capacity).

For example, the negative electrode active material layer 22B is formed by any one kind or two or more kinds of methods among an application method, a vapor phase method, a liquid phase method, a thermal spraying method, and a firing method (a sintering method). For example, the application method is a method in which a particle (powder)-shaped negative electrode active material in a particle (powder) shape is mixed with a negative electrode binding agent and the like, the resultant mixture is dispersed in a solvent such as an organic solvent, and then the resultant dispersed material is applied to the negative electrode current collector 22A. Examples of the vapor phase method include a physical deposition method, a chemical deposition method, and the like. More specific examples of the vapor phase method include a vacuum deposition method, a sputtering method, an ion plating method, a laser ablation method, thermochemical vapor deposition, a chemical vapor deposition (CVD) method, a plasma chemical vapor deposition method, and the like. Examples of the liquid phase method include an electrolytic plating method, an electroless plating method, and the like. The thermal spraying method is a method in which a negative electrode active material in a molten state or a semi-molten state is sprayed to the negative electrode current collector 22A. The firing method is a method in which a mixture dispersed in a solvent is applied to the negative electrode current collector 22A by using, for example, an application method, and then a heat treatment is performed at a temperature higher than the melting point of the negative electrode binding agent and the like. As the firing method, for example, an atmosphere firing method, a reactive firing method, a hot press firing method, and the like can be used.

In the secondary battery, as described above, to prevent unintentional precipitation of the electrode reaction material to the negative electrode 22 during charging, an electrochemical equivalent of the negative electrode material capable of intercalating and deintercalating the electrode reaction material is set to be larger than an electrochemical equivalent of the positive electrode. In addition, when an open circuit voltage (that is, a battery voltage) during complete charging is 4.25 V or higher, even when using the same positive electrode active material, an emission amount of the electrode reaction material per unit mass increases in comparison to a case where the open circuit voltage is 4.20 V, and thus the amount of the positive electrode active material and the negative electrode active material is adjusted in correspondence therewith. According to this, it is possible to a high energy density.

Separator

The separator 23 isolates the positive electrode 21 and the negative electrode 22 from each other, and allows lithium ions pass therethrough while preventing current short-circuiting caused by contact between both of the electrodes. For example, the separator 23 is any porous film of a synthetic resin, ceramic, or the like, and may be a laminated film using two or more kinds of porous films. For example, the synthetic resin is any one kind or two or more kinds of resins among polytetrafluoroethylene, polypropylene, polyethylene, and the like.

Particularly, for example, the separator 23 may include the porous film (base material layer), and a polymeric compound layer that is provided on one surface or both surfaces of the base material layer. This is because adhesiveness of the separator 23 with respect to the positive electrode 21 and the negative electrode 22 is improved, and thus distortion of the wound electrode body 20 is suppressed. According to this, the decomposition reaction of the electrolyte solution is suppressed, and leakage of the electrolyte solution that is impregnated into the base material layer is suppressed. Accordingly, even when repeating charging and discharging, resistance is less likely to increase, and thus battery swelling is suppressed.

For example, the polymeric compound layer includes a polymeric material such as polyvinylidene fluoride. This is because the physical strength of the polymeric compound layer becomes excellent, and the polymeric compound layer becomes electrochemically stable. In addition, the polymeric material may be an additional material other than polyvinylidene fluoride. In a case of forming the polymeric compound layer, for example, a solution in which the polymeric material is dissolved is applied to the base material layer, and then the base material layer is dried. In addition, the base material layer may be immersed in the solution, and then the base material layer may be dried.

Electrolyte Solution

The wound electrode body 20 is impregnated with an electrolyte solution that is a liquid electrolyte. The electrolyte solution has the same configuration as the above-described electrolyte solution of the present disclosure.

Operation of Secondary Battery

For example, the secondary battery operates as follows.

During charging, when lithium ions are deintercalated from the positive electrode 21, the lithium ions are intercalated to the negative electrode 22 through the electrolyte solution. On the other hand, during discharging, when lithium ions are deintercalated from the negative electrode 22, the lithium ions are intercalated to the positive electrode 21 through the electrolyte solution.

Method of Manufacturing Secondary Battery

For example, the secondary battery is manufactured in the following procedure.

In a case of preparing the positive electrode 21, first, the positive electrode active material, and the positive electrode binding agent, the positive electrode conductive agent, and the like (as necessary) are mixed with each other to obtain a positive electrode mixture. Continuously, the positive electrode mixture is dispersed in an organic solvent and the like to obtain paste-like positive electrode mixture slurry. Continuously, the positive electrode mixture slurry is applied to both surfaces of the positive electrode current collector 21A, and then the positive electrode mixture slurry is dried to form the positive electrode active material layer 21B. Continuously, the positive electrode active material layer 21B is compression-molded by using a roll pressing machine and the like while heating the positive electrode active material layer 21B as necessary. In this case, compression molding may be repeated plural times.

In a case of preparing the negative electrode 22, the negative electrode active material layer 22B is formed on the negative electrode current collector 22A by the same procedure as in the positive electrode 21. Specifically, the negative electrode active material, the negative electrode binding agent, the negative electrode conductive agent, and the like are mixed with each other to obtain a negative electrode mixture, and then the negative electrode mixture is dispersed in an organic solvent and the like to obtain paste-like negative electrode mixture slurry. Continuously, the negative electrode mixture slurry is applied to both surfaces of the negative electrode current collector 22A, and then the negative electrode mixture slurry is dried to form the negative electrode active material layer 22B. Finally, the negative electrode active material layer 22B is compression-molded by using a roll pressing machine and the like.

In a case of preparing the electrolyte solution, an electrolyte salt is dispersed and dissolved in a solvent, and then a boron compound is added to the solvent.

In a case of assembling the secondary battery by using the positive electrode 21 and the negative electrode 22, the positive electrode lead 25 is attached to the positive electrode current collector 21A by using a welding method and the like, and the negative electrode lead 26 is attached to the negative electrode current collector 22A by using the welding method and the like. Continuously, the positive electrode 21 and the negative electrode 22 are laminated with the separator 23 interposed therebetween, and then winding is performed to prepare the wound electrode body 20. Then, the center pin 24 is inserted to the center of the wound electrode body 20. Continuously, the wound electrode body 20 is accommodated inside the battery casing 11 while interposing the wound electrode body 20 between the pair of insulating plates 12 and 13. In this case, the tip end of the positive electrode lead 25 is attached to the safety valve mechanism 15 by using the welding method and the like, and the tip end of the negative electrode lead 26 is attached to the battery casing 11 by using the welding method and the like. Continuously, the electrolyte solution is injected to the inside of the battery casing 11, and the separator 23 is impregnated with the electrolyte solution. Continuously, the battery cover 14, the safety valve mechanism 15, and the heat-sensitive resistance element 16 are caulked to the opening end of the battery casing 11 through the gasket 17.

Operation and Effect of Secondary Battery

According to the cylindrical-type lithium ion secondary battery, the electrolyte solution has the same configuration as the electrolyte solution of the present disclosure. According to this, a decomposition reaction of the electrolyte solution is suppressed during charging and discharging, and thus discharging capacity is less likely to decrease even when undergoing charging and discharging. Accordingly, excellent battery characteristics can be obtained. Other operations and effects are the same as in the electrolyte solution of the present disclosure.

2-1-2. Laminate Film Type

Figure 3:
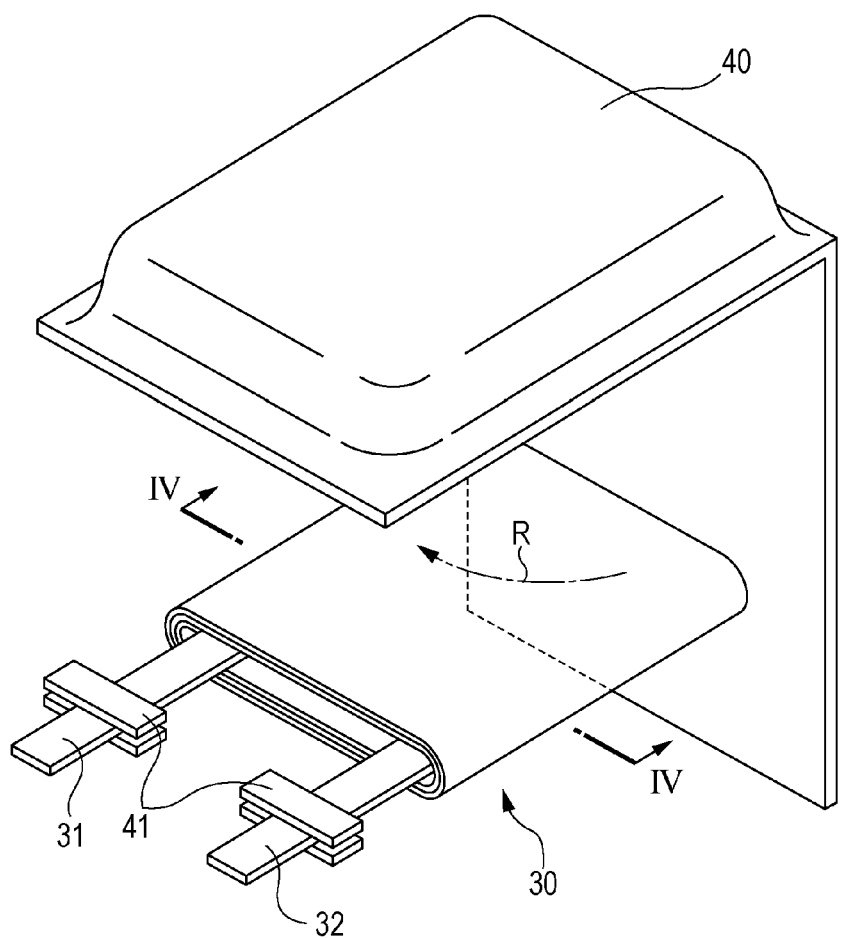
FIG. 3 is a perspective view illustrating a configuration of another secondary battery (laminated film type) according to the embodiment of the present disclosure.
Figure 4:
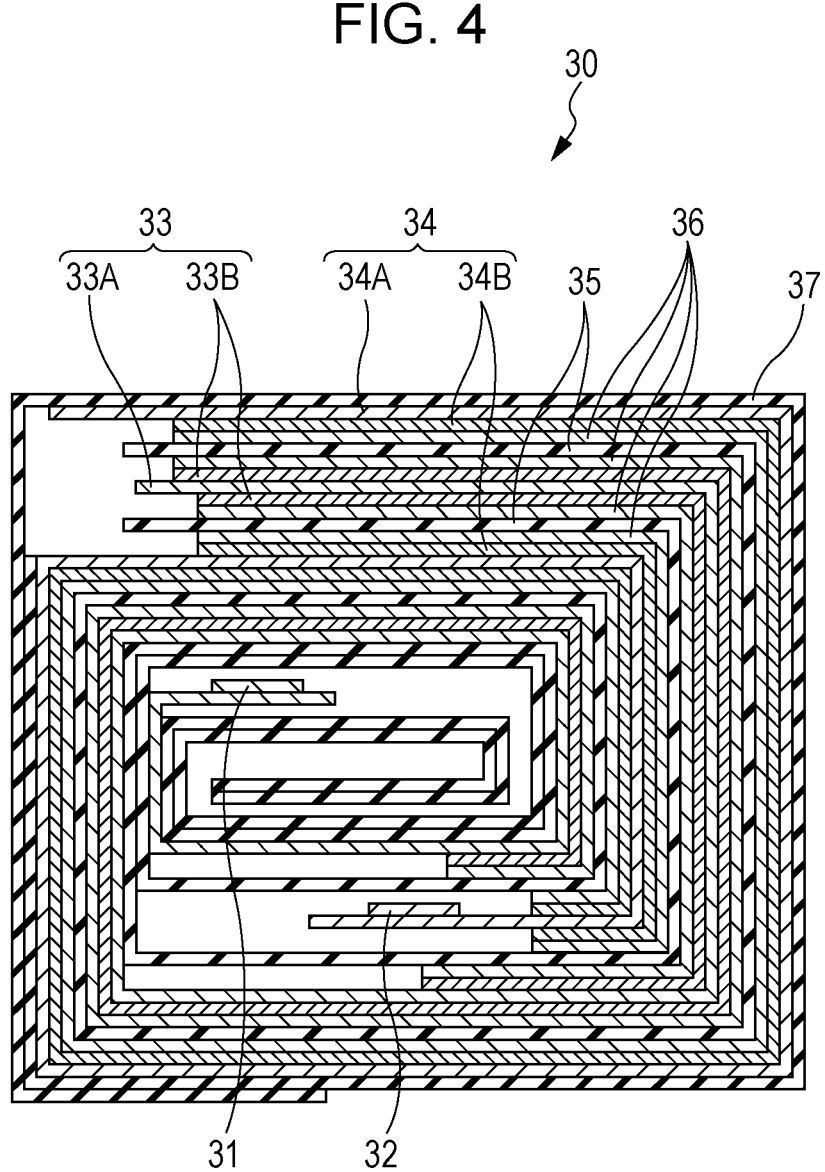
FIG. 4 is a cross-sectional view taken along line IV-IV of the wound electrode body illustrated in FIG. 3.

FIG. 3 illustrates an exploded perspective configuration of another secondary battery according to the embodiment of the present disclosure, and FIG. 4 is an enlarged cross-sectional view taken along line IV-IV of the wound electrode body 30 illustrated in FIG. 3. Hereinafter, constituent elements of the cylindrical type secondary battery described above are frequently cited.

Overall Configuration of Secondary Battery

A secondary battery described here is, for example, a lithium ion secondary battery having a so-called laminated film type battery structure.

In the secondary battery, for example, a wound electrode body 30 is accommodated inside a film-shaped exterior packaging member 40. The wound electrode body 30 has a configuration in which a positive electrode 33 and a negative electrode 34 are laminated through a separator 35 and an electrolyte layer 36, and then the resultant laminated body is wound. A positive electrode lead 31 is attached to the positive electrode 33, and a negative electrode lead 32 is attached to the negative electrode 34. The outermost peripheral portion of the wound electrode body 30 is protected by a protective tape 37.

Each of the positive electrode lead 31 and the negative electrode lead 32 protrudes in the same direction, for example, from the inside of the exterior packaging member 40 toward the outside. For example, the positive electrode lead 31 is formed from any one kind or two or more kinds of conductive materials such as aluminum. For example, the negative electrode lead 32 is formed from any one kind or two or more kinds of conductive materials such as copper, nickel, and stainless steel. For example, the conductive material has a thin plate shape or a network shape.

For example, the exterior packaging member 40 is one sheet of film capable of being folded in an arrow direction R illustrated in FIG. 3, and a depression for accommodation of the wound electrode body 30 is formed at least at a part of the exterior packaging member 40. For example, the exterior packaging member 40 is a laminated film in which a fusion layer, a metal layer, and a surface protective layer are laminated in this order. In a process of manufacturing the secondary battery, the exterior packaging member 40 is folded in such a manner that parts of the fusion layer face each other with the wound electrode body 30 interposed therebetween, and outer peripheral portions of the fusion layer are fused to each other. In addition, the exterior packaging member 40 may be a member in which two sheets of laminated films are bonded to each other with an adhesive and the like interposed therebetween. For example, the fusion layer is any one kind or two or more kinds of films of polyethylene, polypropylene, and the like. For example, the metal layer is any one kind or two or more kinds of aluminum foil and the like. For example, the surface protective layer is any one kind or two or more kinds of films of nylon, polyethyleneterephthalate, and the like.

Among these, it is preferable that the exterior packaging member 40 is an aluminum laminated film in which a polyethylene film, aluminum foil, and a nylon film are laminated in this order. In addition, the exterior packaging member 40 may be a laminated film having other laminated structure, a polymeric film such as polypropylene, or a metal film.

An adhesive film 41 is inserted between the exterior packaging member 40, and the positive electrode lead 31 and the negative electrode lead 32 so as to prevent intrusion of ambient air. The adhesive film 41 is formed from a material having adhesiveness with respect to the positive electrode lead 31 and the negative electrode lead 32. Examples of the material having adhesiveness include a polyolefin resin and the like, and more specific examples thereof include any one kind or two or more kinds of polyethylene, polypropylene, modified polyethylene, modified polypropylene, and the like.

For example, the positive electrode 33 includes a positive electrode active material layer 33B on one surface or both surfaces of a positive electrode current collector 33A. For example, the negative electrode 34 includes a negative electrode active material layer 34B on one surface or both surfaces of a negative electrode current collector 34A. For example, configurations of the positive electrode current collector 33A, the positive electrode active material layer 33B, the negative electrode current collector 34A, and the negative electrode active material layer 34B are the same as the configurations of the positive electrode current collector 21A, the positive electrode active material layer 21B, the negative electrode current collector 22A, and the negative electrode active material layer 22B, respectively. For example, a configuration of a separator 35 is the same as the configuration of the separator 23.

An electrolyte layer 36 includes an electrolyte solution and a polymeric compound, and the electrolyte solution is retained by the polymeric compound. The electrolyte layer 36 is configured of a so-called gel-like electrolyte. This is because high ion conductivity (for example, 1 mS/cm or greater at room temperature) can be obtained, and leakage of the electrolyte solution is prevented. In addition, the electrolyte layer 36 may further include an additional material such as an additive.

For example, the polymeric compound include any one kind or two or more kinds of polyacrylonitrile, polyvinylidene fluoride, polytetrafluoroethylene, polyhexafluoropropylene, polyethylene oxide, polypropylene oxide, polyphosphazen, polysiloxane, polyvinyl fluoride, polyvinyl acetate, polyvinyl alcohol, polymethyl methacrylate, polyacrylic acid, polymethacrylic acid, a styrene-butadiene rubber, a nitrile-butadiene rubber, polystyrene, polycarbonate, and the like. In addition, the polymeric compound may be a copolymer. Examples of the copolymer include a copolymer of vinylidene fluoride and hexafluoropyrene, and the like. Among these, as a homopolymer, the polyvinylidene fluoride is preferable, and as the copolymer, a copolymer of vinylidene fluoride and hexafluoropyrene is preferable. This is because the polymeric compound is electrochemically stable.

For example, a configuration of the electrolyte solution is the same as the configuration of the electrolyte solution that is used in the cylindrical type secondary battery. However, in the electrolyte layer 36 that is a gel-like electrolyte, the solvent of the electrolyte solution has a broad concept that includes not only a liquid material but also a material having ion conductivity capable of dissociating an electrolyte salt. Accordingly, in a case of using a polymeric compound having ion conductivity, the polymeric compound is also included in the solvent.

In addition, the electrolyte solution may be used as is instead of the gel-like electrolyte layer 36. In this case, the wound electrode body 30 is impregnated with the electrolyte solution.

Operation of Secondary Battery

For example, the secondary battery operates as follows.

During charging, when lithium ions are deintercalated from the positive electrode 33, the lithium ions are intercalated to the negative electrode 34 through the electrolyte layer 36. On the other hand, during discharging, when lithium ions are deintercalated from the negative electrode 34, the lithium ions are intercalated to the positive electrode 33 through the electrolyte layer 36.

Method of Manufacturing Secondary Battery

The secondary battery provided with the gel-like electrolyte layer 36 is manufactured, for example, by the following three types of procedures.

In a first procedure, the positive electrode 33 and the negative electrode 34 are prepared in the same preparation procedure as in the positive electrode 21 and the negative electrode 22. That is, in a case of preparing the positive electrode 33, the positive electrode active material layer 33B is formed on both surfaces of the positive electrode current collector 33A, and in a case of preparing the negative electrode 34, the negative electrode active material layer 34B is formed on both surfaces of the negative electrode current collector 34A. Continuously, the electrolyte solution, the polymeric compound, the solvent, and the like mixed with each other to prepare a precursor solution. This solvent is, for example, an organic solvent, and the like. Continuously, the precursor solution is applied to the positive electrode 33A and the negative electrode 34, and the precursor solution is dried to form the gel-like electrolyte layer 36. Continuously, the positive electrode lead 31 is attached to the positive electrode current collector 33A by using a welding method and the like, and the negative electrode lead 32 is attached to the negative electrode current collector 34A by the welding method and the like. Continuously, the positive electrode 33 and the negative electrode 34 are laminated with the separator 35 interposed therebetween, and then winding is performed to prepare the wound electrode body 30. Then, the protective tape 37 is bonded to the outermost peripheral portion of the wound electrode body 30. Continuously, the exterior packaging member 40 is folded with the wound electrode body 30 interposed between parts of the folded exterior packaging member 40, and then parts of the outer peripheral portion of the exterior packaging member 40 are bonded to each other using a thermal fusion method and the like to seal the wound electrode body 30 inside the exterior packaging member 59. In this case, the adhesive film 41 is inserted between the positive electrode lead 31 and the negative electrode lead 32, and the exterior packaging member 40.

In a second procedure, the positive electrode lead 31 is attached to the positive electrode 33, and the negative electrode lead 52 is attached to the negative electrode 34. Continuously, the positive electrode 33 and the negative electrode 34 are laminated through the separator 35, and winding is performed to prepare a wound body that is a precursor of the wound electrode body 30. Then, the protective tape 37 is bonded to the outermost peripheral portion of the wound body. Continuously, the exterior packaging member 40 is folded with the wound electrode body 30 interposed between parts of the folded exterior packaging member 40, and then remaining outer peripheral portions except for one outer peripheral portion of the exterior packaging member 40 are subjected to bonding by using a thermal fusion method and the like to accommodate the wounded body inside the bag-like exterior packaging member 40. Continuously, the electrolyte solution, monomers which are raw materials of the polymeric compound, a polymerization initiator, and an additional material such as a polymerization inhibitor (as necessary) are mixed with each other to prepare a composition for an electrolyte. Continuously, the composition for an electrolyte is injected to the inside of the bag-like exterior packaging member 40, and then the exterior packaging member 40 is sealed by using the thermal fusion method and the like. Continuously, the monomers are polymerized to form the polymeric compound. According to this, the gel-like electrolyte layer 36 is formed.

In a third procedure, the wound body is prepared in the same manner as in the second procedure except that the separator 35 to which the polymeric compound is applied to both surfaces thereof is used, and then the wound body is accommodated inside the bag-like exterior packaging member 40. Examples of the polymeric compound that is applied to the separator 35 include a polymer (a homopolymer, a copolymer, or a multi-component polymer) including vinylidene fluoride as a component, and the like. Specific examples of the polymeric compound include a binary copolymer including polyvinylidene fluoride, vinylidene fluoride, and hexafluoropropylene as a component, a ternary copolymer including vinylidene fluoride, hexafluoropropylene, and chlorotrifluoroethylene as a component, and the like. In addition, other one or more kinds of polymeric compounds may be used in combination with the copolymer including vinylidene fluoride as a component. Continuously, the electrolyte solution is prepared, and is injected to the inside of the exterior packaging member 40, and then an opening of the exterior packaging member 40 is sealed by using the thermal fusion method and the like. Continuously, the exterior packaging member 40 is heated while applying a weight thereto, thereby bringing the separator 35 into close contact with the positive electrode 33 and the negative electrode 34 through the polymeric compound. According to this, the polymeric compound is impregnated with the electrolyte solution, and the polymeric compound is gelated, and thus the electrolyte layer 36 is formed.

In a third procedure, swelling of the secondary battery is further suppressed in comparison to the first procedure. In addition, in the third procedure, the solvent, the monomers which are raw materials of the polymeric compound, and the like hardly exist in the electrolyte layer 36, and thus a process of forming the polymeric compound is controlled in a satisfactory manner in comparison to the second procedure. Accordingly, the positive electrode 33, the negative electrode 34, and the separator 35 sufficiently come into close contact with the electrolyte layer 36.

Operation and Effect of Secondary Battery

According to the laminated film type secondary battery, the electrolyte solution that is included in the electrolyte layer 36 has the same configuration as the electrolyte solution of the present disclosure, and thus the same operation and effect as those of the cylindrical type lithium secondary battery can be obtained.

2-2. Lithium Metal Secondary Battery

A secondary battery described here is a cylindrical type lithium secondary battery (a lithium metal secondary battery) in which the capacity of the negative electrode 22 is exhibited by precipitation and dissolution of a lithium metal. The secondary battery has the same configuration as the above-described lithium ion secondary battery (cylindrical type) except that the negative electrode active material layer 22B is formed from the lithium metal, and is manufactured through the same procedure as in the lithium ion secondary battery.

In the secondary battery, the lithium metal is used as the negative electrode active material, and thus a high energy density can be obtained. The negative electrode active material layer 22B may exist already during assembling, but also may not exist during assembling and may be formed by a lithium metal that precipitates during charging. In addition, the negative electrode active material layer 22B may be used as a current collector so as to be able to omit the negative electrode current collector 22A.

For example, the secondary battery operates as follows. During charging, when lithium ions are deintercalated from the positive electrode 21, the lithium ions precipitate to a surface of the negative electrode current collector 22A as a lithium metal through the electrolyte solution. During discharging, when the lithium metal from the negative electrode active material layer 22B is eluted in the electrolyte solution as lithium ions, the lithium ions are intercalated to the positive electrode 21 through the electrolyte solution.

According to the cylindrical type lithium metal secondary battery, the electrolyte solution has the same configuration as the electrolyte solution of the present disclosure, and thus excellent battery characteristics can be obtained for the same reason as in the lithium ion secondary battery.

In addition, the configuration of the lithium metal secondary battery described here is not limited to the cylindrical type secondary battery, and may be applied to a laminated film type secondary battery. In this case, the same effect can also be obtained.

3. Use of Secondary Battery

Next, an application example of the above-described secondary battery will be described.

The use of the secondary battery is not particularly limited as long as the secondary battery is used as a power supply for drive, a power storage source for power storage, and the like in a machine, an apparatus, equipment, a device, a system (an assembly of a plurality of apparatuses and the like), and the like. The secondary battery that is used as a power supply may be a main power supply (a power supply that is preferentially used), or an auxiliary power supply (a power supply that is used instead of the main power supply or a power supply that is switched from the main power supply and is used). In a case of using the secondary battery as an auxiliary power supply, the type of the main power supply is not limited to the secondary battery.

Examples of the use of the secondary battery include being used in an electronic apparatus (including portable electronic apparatuses) such as a video camera, a digital still camera, a portable phone, a note-book computer, a cellular phone, a headphone stereo, a portable radio, a portable television, and a personal digital assistant. In addition, examples of the use of the secondary battery include being used in portable household appliances such as an electric shaver. In addition, examples of the use of the secondary battery include being used in a backup power supply, and a storage device such as a memory card. In addition, examples of the use of the secondary battery include being used in an electrically driven tool such as an electrically driven drill and an electrically driven saw. In addition, examples of the use of the secondary battery include being used in a battery pack that is used in a notebook computer and the like as a detachable power supply. In addition, examples of the use of the secondary battery include being used in a medical electronic apparatus such as a pacemaker and a hearing aid. In addition, examples of the use of the secondary battery include being used in an electrically driven vehicle such as an electric vehicle (including a hybrid car). In addition, examples of the use of the secondary battery include being used in a power storage system such as an in-house battery system that stores power for an emergency. In addition, other uses are also possible.

Among these, it is effective if the secondary battery is applied to the battery pack, the electrically driven vehicle, the power storage system, the electrically driven tool, the electronic apparatus, and the like. This is because excellent battery characteristics are demanded, and thus when using the secondary battery of the present disclosure, it is possible to effectively realize an improvement in performance. In addition, the battery pack is a power supply using the secondary battery, and is a so-called assembled battery, or the like. The electrically driven vehicle is a vehicle that operates (travels) using the secondary battery as a power supply for drive, and may be a vehicle (a hybrid car and the like) provided with a drive source other than the secondary battery as described above. The power storage system is a system using the secondary battery as a power storage source. For example, in a household power storage system, power is stored in the secondary battery that is a power storage source, and thus a household electric appliance and the like can be used by utilizing the power. The electrically driven tool is a tool in which a movable portion (for example, a drill and the like) is driven by using the secondary battery as a power supply for drive. The electronic apparatus is an apparatus that exhibits various functions by using the secondary battery as a power supply for drive (power supply source).

Here, several application examples of the secondary battery will be described in detail. In addition, the configuration of the following application examples is illustrative only, and thus the configuration may be appropriately modified.

3-1. Battery Pack (Single Battery)

Figure 5:
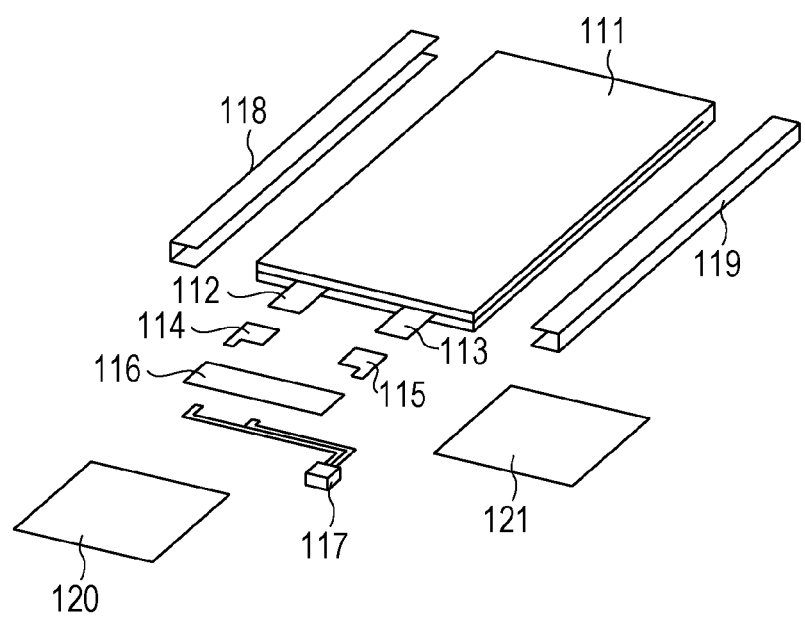
FIG. 5 is a perspective view illustrating a configuration of an application example (battery pack: single battery) of the secondary battery.
Figure 6:
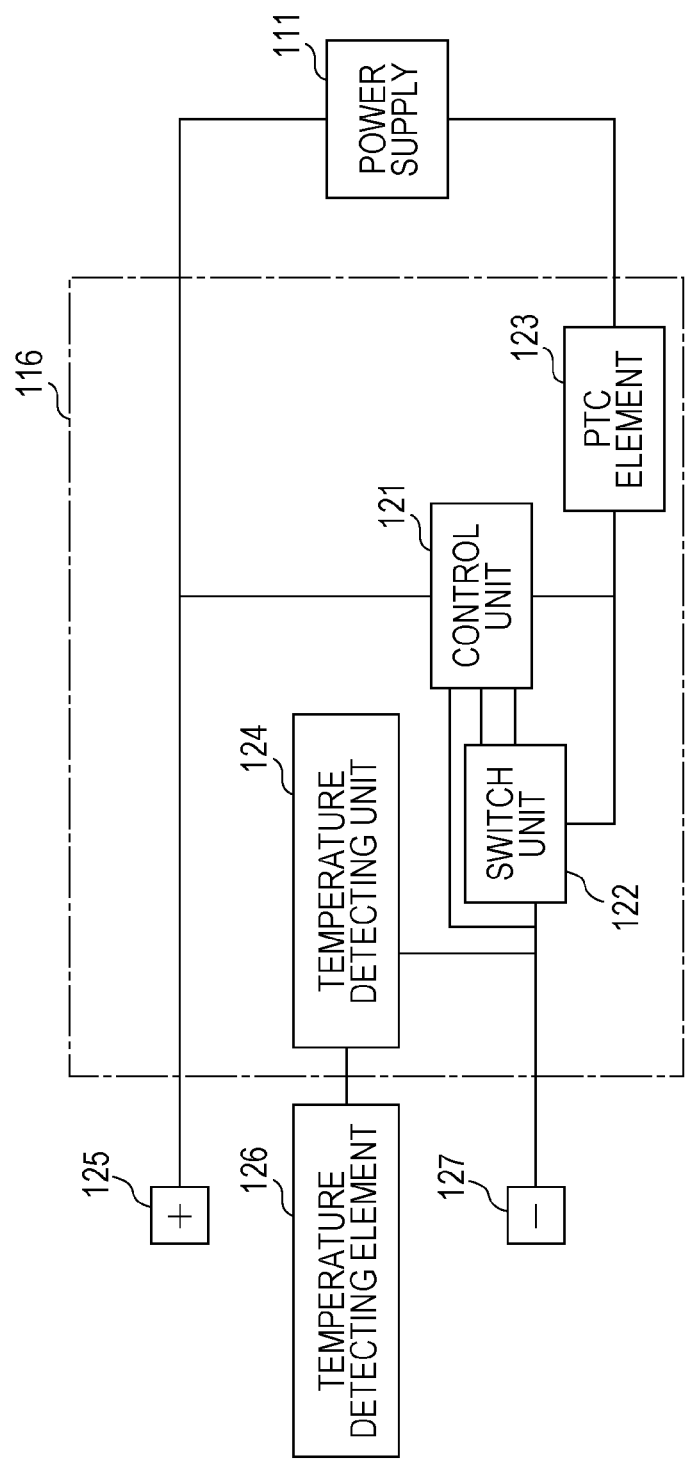
FIG. 6 is a block diagram illustrating a configuration of the battery pack illustrated in FIG. 5.

FIG. 5 illustrates a perspective configuration of a battery pack using a single battery, and FIG. 6 illustrates a block configuration of the battery pack illustrated in FIG. 5. In addition, in FIG. 5, a state in which the battery pack has exploded is illustrated.

The battery pack described here is a simple type battery pack (a so-called a soft pack) using one secondary battery, and for example, the battery pack is mounted on an electronic apparatus that is represented by a smart phone, and the like. For example, as illustrated in FIG. 5, the battery pack includes a power supply 111 that is a laminated film type secondary battery, and a circuit substrate 116 that is connected to the power supply 111. A positive electrode lead 112 and a negative electrode lead 113 are attached to the power supply 111.

A pair of adhesive tapes 118 and 119 is bonded to both side surfaces of the power supply 111. A protective circuit (PCM: Protection Circuit Module) is formed in the circuit substrate 116. The circuit substrate 116 is connected to a positive electrode 112 through a tab 114, and is connected to a negative electrode lead 113 through a tab 115. In addition, the circuit substrate 116 is connected to a connector-attached lead line 117 for external connection. In addition, in a state in which the circuit substrate 116 is connected to the power supply 111, the circuit substrate 116 is protected from an upper side and a lower side by a label 120 and an insulating sheet 121. When the label 120 is attached, the circuit substrate 116, the insulating sheet 121, and the like are fixed.

In addition, for example, as illustrated in FIG. 6, the battery pack includes the power supply 111 and the circuit substrate 116. For example, the circuit substrate 116 includes a control unit 121, a switch unit 122, a PTC 123, and a temperature detecting unit 124. The power supply 111 can be connected to the outside through a positive electrode terminal 125 and a negative electrode terminal 127, and thus the power supply 111 is charged and discharged through the positive electrode terminal 125 and the negative electrode terminal 127. The temperature detecting unit 124 can detect a temperature by using a temperature detecting terminal (a so-called T terminal) 126.

The control unit 121 controls an operation (including a used state of the power supply 111) of the entirety of the battery pack, and includes, for example, a central processing unit (CPU), a memory, and the like.

For example, when a battery voltage reaches an over-charging detection voltage, the control unit 121 cuts off the switch unit 122 in order for a charging current not to flow through a current path of the power supply 111. In addition, for example, when a large current flows during charging, the control unit 121 cuts off the switch unit 122 so as to shut off the charging current.

In addition, for example, when the battery voltage reaches an over-discharging detection voltage, the control unit 121 cuts off the switch unit 122 so that a discharging current does not to flow through the current path of the power supply 111. In addition, for example, when a large current flows during discharging, the control unit 121 cuts off the switch unit 122 so as to shut off the discharging current.

In addition, the over-charging detection voltage of the secondary battery is, for example, 4.20 V±0.05 V, and the over-discharging detection voltage is, for example, 2.4 V±0.1 V.

The switch unit 122 switches the use state (connection and non-connection between the power supply 111 and an external apparatus) of the power supply 111 in response to an instruction from the control unit 121. For example, the switch unit 122 includes a charging control switch, a discharging control switch, and the like. For example, each of the charging control switch and the discharging control switch is a semiconductor switch such as a field effect transistor (MOSFET) using a metal oxide semiconductor. In addition, for example, the charging and discharging current is detected on the basis of ON-resistance of the switch unit 122.

The temperature detecting unit 124 measures a temperature of the power supply 111, and outputs the measurement result to the control unit 121. For example, the temperature detecting unit 124 includes a temperature detecting element such as a thermistor. In addition, the measurement result obtained by the temperature detecting unit 124 is used during a case where the control unit 121 performs charging and discharging control during abnormal heat generation, a case where the control unit 121 performs a correction process during calculation of a residual capacity, and the like.

In addition, the circuit substrate 116 may not include the PTC 123. In this case, a PTC element may be separately provided to the circuit substrate 116.

3-2. Battery Pack (Assembled Battery)

Figure 7:
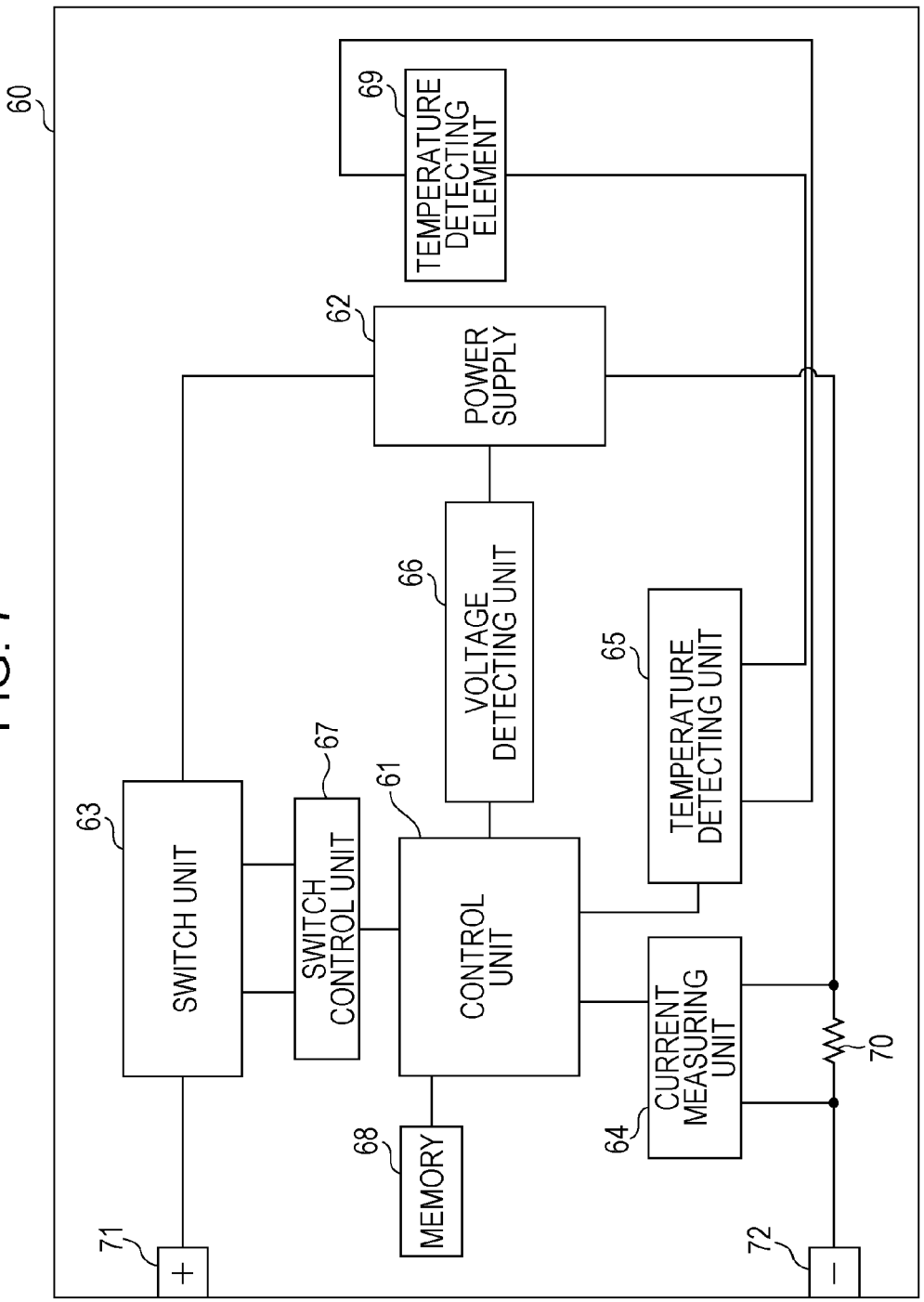
FIG. 7 is a block diagram illustrating a configuration of an application example (battery pack: assembled battery) of the secondary battery.

FIG. 7 illustrates a block configuration of a battery pack using an assembled battery. For example, the battery pack includes a control unit 61, a power supply 62, a switch unit 63, a current measuring unit 64, a temperature detecting unit 65, a voltage detecting unit 66, a switch control unit 67, a memory 68, a temperature detecting element 69, a current detecting resistor 70, a positive electrode terminal 71, and a negative electrode terminal 72 at the inside of a casing 60 formed from a plastic material and the like.

The control unit 61 controls an operation (including a use state of the power supply 62) of the entirety of the battery pack, and includes, for example, a CPU and the like. The power supply 62 includes one or more secondary batteries (not illustrated). For example, the power supply 62 is an assembled battery including two or more secondary batteries, and a connection type of the secondary batteries may be a series type, a parallel type, or a combination type thereof. As an example, the power supply 62 includes six secondary batteries which are connected in a two-parallel and three-series connection.

The switch unit 63 switches the use state (connection and non-connection between the power supply 62 and an external apparatus) of the power supply 62 in response to an instruction from the control unit 61. For example, the switch unit 63 includes a charging control switch, a discharging control switch, a diode for charging, a diode for discharging (all of these are not illustrated), and the like. For example, each of the charging control switch and the discharging control switch is a semiconductor switch such as a field effect transistor (MOSFET) using a metal oxide semiconductor.

The current measuring unit 64 measures a current by using the current detecting resistor 70, and outputs the measurement result to the control unit 61. The temperature detecting unit 65 measures a temperature by using the temperature detecting element 69, and outputs the measurement result to the control unit 61. For example, the temperature measurement result is used for a case where the control unit 61 performs charging and discharging control during abnormal heat generation, a case where the control unit 61 performs a correction process during calculation of residual capacity, and the like. The voltage detecting unit 66 measures a voltage of the secondary battery in the power supply 62, A/D converts a measurement voltage, and supplies the converted value to the control unit 61.

The switch control unit 67 controls an operation of the switch unit 63 in response to signals which are input from the current measuring unit 64 and the voltage detecting unit 66.

For example, when a battery voltage reaches an over-charging detection voltage, the switch control unit 67 cuts off the switch unit 63 (charging control switch) so that a charging current does not to flow through a current path of the power supply 62. According to this, in the power supply 62, only discharging is possible through the diode for discharging. In addition, for example, if a large current flows during charging, the switch control unit 67 cuts off the charging current.

In addition, for example, when the battery voltage reaches an over-discharging detection voltage, the switch control unit 67 cuts off the switch unit 63 (discharging control switch) so that a discharging current does not to flow through the current path of the power supply 62. According to this, in the power supply 62, only charging is possible through the diode for charging. In addition, for example, in a case where a large current flows during discharging, the switch control unit 67 cuts off the discharging current.

In addition, in the secondary battery, for example, the over-charging detection voltage is 4.20 V±0.05 V, and the over-discharging detection voltage is 2.4 V±0.1 V.

For example, the memory 68 is an EEPROM that is a nonvolatile memory, and the like. For example, a numerical value operated by the control unit 61, information (for example, internal resistance in an initial state, and the like) of the secondary battery which is measured in a manufacturing process, and the like are stored in the memory 68. In addition, when a full charging capacity of the secondary battery is stored in the memory 68, the control unit 61 can grasp information such as a residual capacity.

The temperature detecting element 69 measures a temperature of the power supply 62, and outputs the measurement result to the control unit 61. For example, the temperature detecting element 69 is a thermistor and the like.

The positive electrode terminal 71 and the negative electrode terminal 72 are terminals which are connected to an external apparatus (for example, a notebook-type personal computer and the like) that operates by using the battery pack, an external apparatus (for example, a charger and the like) that is used to charge the battery pack, and the like. Charging and discharging of the power supply 62 is performed through the positive electrode terminal 71 and the negative electrode terminal 72.

3-3. Electrically Driven Vehicle

Figure 8:
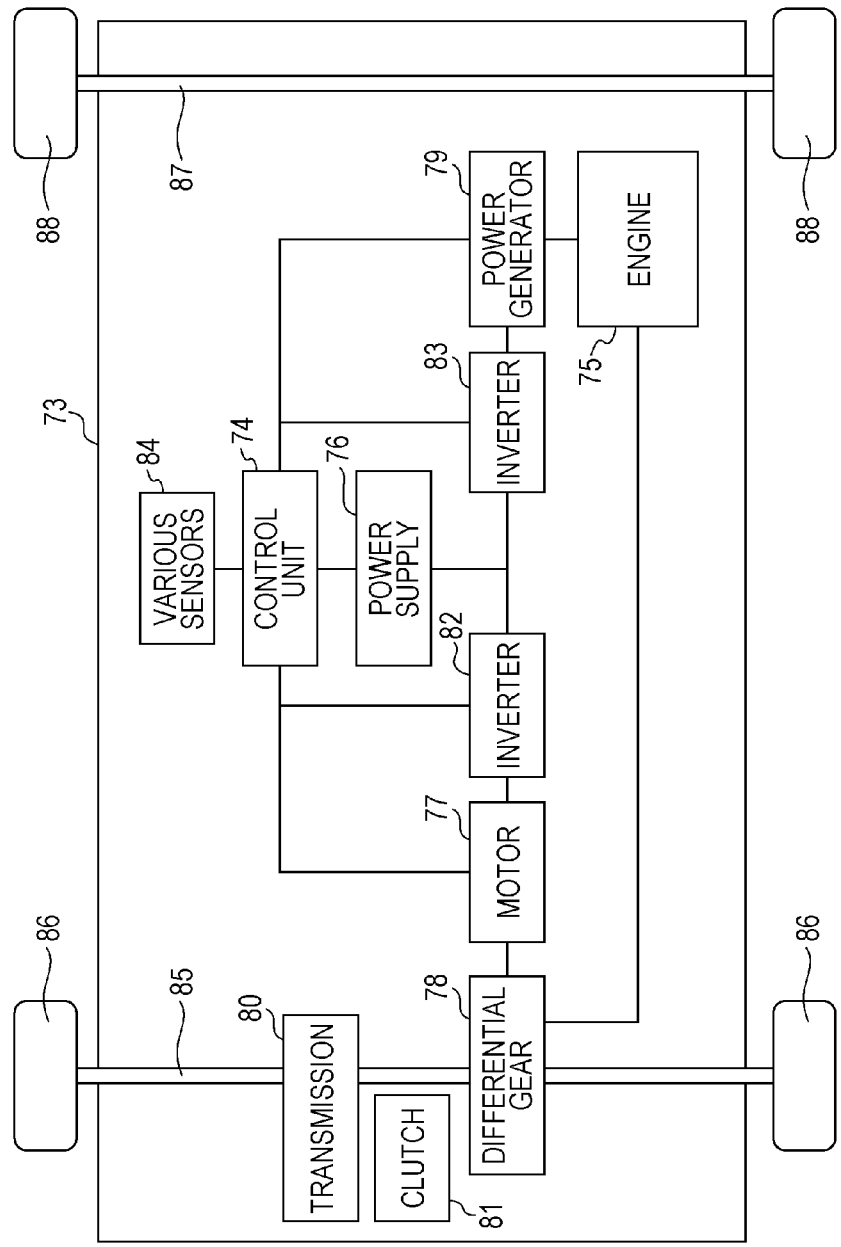
FIG. 8 is a block diagram illustrating a configuration of an application example (electrically driven vehicle) of the secondary battery.

FIG. 8 illustrates a block configuration of a hybrid car that is an example of an electrically driven vehicle. For example, the electrically driven vehicle includes a control unit 74, an engine 75, a power supply 76, a motor 77 for driving, a differential gear 78, a generator 79, a transmission 80, a clutch 81, inverters 82 and 83, and various sensors 84 at the inside of a metal casing 73 formed from a metal. In addition, for example, the electrically driven vehicle includes a front-wheel drive shaft 85 and front wheels 86 which are connected to the differential gear 78 and the transmission 80, and a rear-wheel drive shaft 87 and rear wheels 88.

For example, the electrically driven vehicle can travel by using either the engine 75 or the motor 77 as a drive source. The engine 75 is an important drive source, and examples thereof include a gasoline engine and the like. In a case of using the engine 75 as a power source, for example, a drive force (rotational force) of the engine 75 is transmitted to the front wheels 86 or the rear wheels 88 through the differential gear 78, the transmission 80, and the clutch 81 which constitute a drive unit. In addition, the rotational force of the engine 75 is also transmitted to the generator 79, and the generator 79 generates AC power using the rotational force, and the AC power is converted to DC power through the inverter 83 and is stored in the power supply 76. On the other hand, in a case of using the motor 77 that is a converting unit, as a power source, power (DC power) supplied from the power supply 76 is converted to AC power through the inverter 82, and the motor 77 operates by using the AC power. The drive force (rotational force) converted from the power by the motor 77 is transmitted, for example, to the front wheels 86 or the rear wheels 88 through the differential gear 78, the transmission 80, and the clutch 81 which constitute the drive unit.

In addition, when the electrically driven vehicle is decelerated through a brake mechanism (not shown), a resistance force during deceleration may be transmitted to the motor 77 as a rotational force, and the motor 77 may be configured to generate AC power by using the rotational force. The AC power is converted to DC power through the inverter 82, and DC regenerated power is preferably stored in the power supply 76.

The control unit 74 controls an operation of the entirety of the electrically driven vehicle, and includes, for example, a CPU and the like. The power supply 76 includes one or more secondary batteries (not illustrated). The power supply 76 may be configured in such a manner that the power supply 76 is connected to an external power supply, and power is supplied to the power supply 76 from the external power supply so as to store the power. For example, the various sensors 84 are used to control the number of revolutions of the engine 75, and to control the degree of opening of a throttle valve (not shown). For example, the various sensors 84 include a speed sensor, an acceleration sensor, an engine speed sensor, and the like.

In addition, description has been given to a case where the electrically driven vehicle is the hybrid vehicle, but the electrically driven vehicle may be vehicle (electric vehicle) that operates by using only the power supply 76 and the motor 77 without using the engine 75.

3-4. Power Storage System

Figure 9:
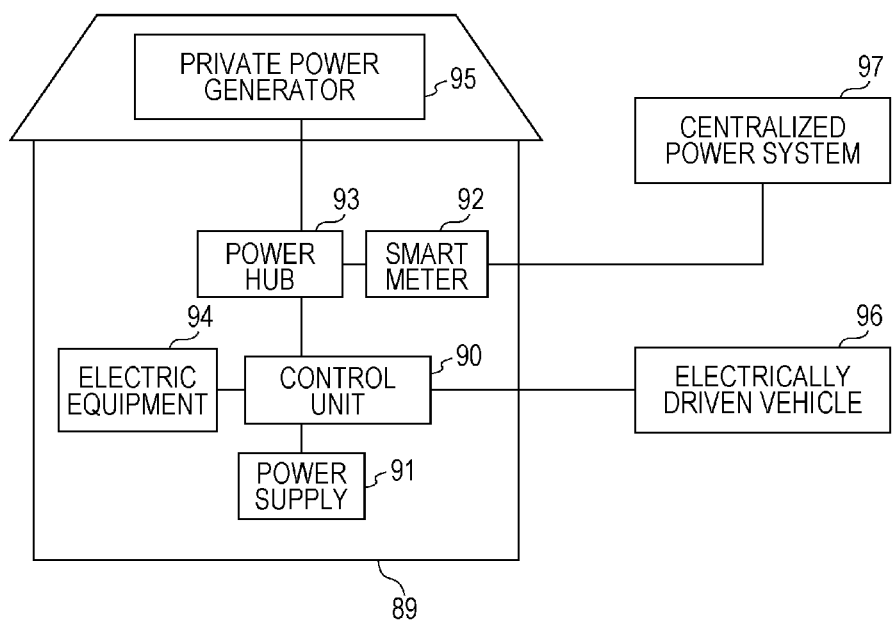
FIG. 9 is a block diagram illustrating a configuration of an application example (power storage system) of the secondary battery.

FIG. 9 illustrates a block configuration of a power storage system. For example, the power storage system includes a control unit 90, a power supply 91, a smart meter 92, and a power hub 93 at the inside of a house 89 such as a general house and a commercial building.

Here, for example, the power supply 91 is connected to electric equipment 94 provided inside the house 89, and can be connected to an electrically driven vehicle 96 that is parked at the outside of the house 89. In addition, for example, the power supply 91 is connected to a private power generator 95 provided to the house 89 through the power hub 93, and can be connected to a centralized power system 97 at the outside through the smart meter 92 and the power hub 93.

In addition, for example, the electric equipment 94 includes one or more household appliances, and examples of the household appliances include a refrigerator, an air conditioner, a television, a water heater, and the like. For example, the private power generator 95 is any one kind or two or more kinds of a solar power generator, a wind power generator, and the like. For example, the electrically driven vehicle 96 is any one kind or two or more kinds of an electric vehicle, an electric bike, a hybrid car, and the like. For example, the centralized power system 97 is any one kind or two or more kinds of a thermal power plant, a nuclear power plant, a hydraulic power plant, a wind power plant, and the like.

The control unit 90 controls an operation (including a use state of the power supply 91) of the entirety of the power storage system, and includes, for example, a CPU and the like. The power supply 91 also includes one or more secondary batteries (not illustrated). For example, the smart meter 92 is a network corresponding type power system which is provided in the house 89 on a power demand side, and can communicate with a power supply side. Accordingly, for example, the smart meter 92 controls the balance of power supply and demand in the house 89 while communicating with the outside, and thus it is possible to efficiently realize stable energy supply.

In the power storage system, for example, power is stored in the power supply 91 from the centralized power system 97 that is an external power supply through the smart meter 92 and the power hub 93, and power is stored in the power supply 91 from the private power generator 95 that is an independent power supply through the power hub 93. The power that is stored in the power supply 91 is supplied to the electric equipment 94 and the electrically driven vehicle 96 in response to an instruction from the control unit 91, and thus the electric equipment 94 can operate, and the electrically driven vehicle 96 can be charged. That is, the power storage system is a system that realizes storage and supply of power in the house 89 by using the power supply 91.

Power that is stored in the power supply 91 can be used in an arbitrary manner. Therefore, for example, power is stored in the power supply 91 from the centralized power system 97 in the nighttime during which power is cheap, and the power stored in the power supply 91 can be used in the daytime when power is expensive.

In addition, the above-described power storage system may be provided for one house (one household), and may be provided for a plurality of houses (plurality of households).

3.5. Electrically Driven Tool

Figure 10:
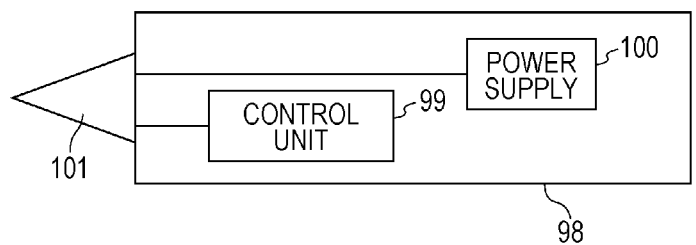
FIG. 10 is a block diagram illustrating a configuration of an application example (electrically driven tool) of the secondary battery.

FIG. 10 illustrates a block configuration of an electrically driven tool. For example, the electrically driven tool is an electrically driven drill, and includes a control unit 99 and a power supply 100 at the inside of a tool main body 98 formed from a plastic material and the like. For example, a drill unit 101 that is a movable unit is attached to the tool main body 98 in a movable manner (in a rotatable manner).

The control unit 99 controls an operation (including a use state of the power supply 100) of the entirety of the electrically driven tool, and includes, for example, a CPU and the like. The power supply 100 includes one or more secondary batteries (not illustrated). The control unit 99 supplies power from the power supply 100 to the drill unit 101 in response to manipulation of an operation switch (not illustrated).

EXAMPLES

Specific examples of the present disclosure will be described in detail.

Experimental Examples 1-1 to 1-20

A laminated film type lithium ion secondary battery illustrated in FIGS. 3 and 4 was prepared in the following order.

In a case of preparing the positive electrode 33, first, 91 parts by mass of positive electrode active material (LCO=LiCoO$_2$), 3 parts by mass of positive electrode binding agent (polyvinylidene fluoride), and 6 parts by mass of positive electrode conductive agent (graphite) were mixed with each other to prepare a positive electrode mixture. In a case of obtaining the positive electrode active material, lithium carbonate (Li$_2$CO$_3$) and cobalt carbonate (CoCO$_3$) were mixed at a molar ratio of 0.5:1, and then the resultant mixture was fired in the air (900° C×5 hours). Continuously, the positive electrode mixture was dispersed in an organic solvent (N-methyl-2-pyrrolidone) to prepare positive electrode mixture slurry. Continuously, the positive electrode mixture slurry was uniformly applied to both surfaces of the positive electrode current collector 33A (strip-shaped aluminum foil having a thickness of 12 μm), and then the positive electrode mixture slurry was dried to form the positive electrode active material layer 33B. Finally, the positive electrode active material layer 33B was compression-molded by using a roll pressing machine.

In a case of preparing the negative electrode 34, first, 96 parts by mass of negative electrode active material (graphite as a carbon material), and 3 parts by mass of negative electrode binding agent were mixed with each other to prepare a negative electrode mixture. An average particle size (median diameter D50) of graphite was set to 20 μm. As the negative electrode binding agent, a mixture of 1.5 parts by weight of styrene-butadiene copolymer and 1.5 parts by weight of carboxymethyl cellulose was used. Continuously, the negative electrode mixture was dispersed in water to prepare negative electrode mixture slurry. Continuously, the negative electrode mixture slurry was uniformly applied to both surfaces of the negative electrode current collector 34A (strip-shaped copper foil having a thickness of 15 μm), and the negative electrode mixture slurry was dried to form the negative electrode active material layer 34B. In this case, an amount of the negative electrode active material with respect to an amount of the positive electrode active material was adjusted in order for an open circuit voltage (battery voltage) during full charging to be an upper limit voltage (V). The upper limit voltage is as shown in Table 1. Finally, the negative electrode active material layer 34B was compression-molded by using the roll pressing machine.

In a case of preparing a liquid electrolyte (electrolyte solution), an electrolyte salt (LiPF$_6$) was dissolved in a mixed solvent (ethylene carbonate and ethyl methyl carbonate) to prepare a mixed solution. In this case, a composition of the mixed solvent was set to ethylene carbonate:ethyl methyl carbonate=35:65 in terms of a volume ratio, and an amount of the electrolyte salt with respect to the mixed solvent was set to 1.2 mol/dm$^3$ (=1 mol/l). Continuously, a boron compound was added to the mixed solution as necessary, and the resultant mixed solution was stirred. Existence or non-existence of the boron compound, a kind thereof, and an amount (% by mass) thereof in the electrolyte solution are as shown in Table 1. In addition, for comparison, an additional boron compound was also added to the mixed solution as necessary.

In a case of assembling a secondary battery, first, the positive electrode lead 31 formed from aluminum was welded to the positive electrode 33 (positive electrode current collector 33A), and the negative electrode lead 32 formed from copper was welded to the negative electrode 34 (negative electrode current collector 34A). Continuously, the positive electrode 33 and the negative electrode 34 were laminated through the separator 35 (polyethylene film having a thickness of 20 μm), and then winding was performed in a longitudinal direction to prepare the wound electrode body 30. Then, the protective tape 37 was bonded to the outermost peripheral portion of the wound electrode body 30. Continuously, the exterior packaging member 40 was folded with the wound electrode body 30 interposed therebetween, and then an outer peripheral portion on three sides of the exterior packaging member 40 was subjected to thermal fusion. According to this, the wound electrode body 30 was accommodated inside the bag-shaped exterior packaging member 40. The exterior packaging member 40 is a humidity-resistant aluminum laminated film in which a nylon film having a thickness of 25 μm, aluminum foil having a thickness of 40 μm, and a polypropylene film having a thickness of 30 μm were laminated in this order from an outer side. Finally, the electrolyte solution was injected to the inside of the exterior packaging member 40 in order for the wound electrode body 30 to be impregnated with the electrolyte solution, and then the remaining one side of the exterior packaging member 40 was subjected to thermal fusion in a reduced pressure atmosphere. In this case, the adhesive film 41 (acid-modified propylene film having a thickness of 50 μm) was inserted between the positive electrode lead 31 and the negative electrode lead 32, and the exterior packaging member 40.

Battery characteristics (cycle characteristics) of the secondary battery were examined, and from the examination, results shown in Table 1 were obtained.

In a case of examining the cycle characteristics at room temperature, first, the secondary battery was charged and discharged for one cycle in a room temperature (23° C.) environment so as to stabilize a battery state. Continuously, the secondary battery was charged and discharged again in the same environment and a discharging capacity in a $2^{nd}$ cycle was measured. Continuously, the secondary battery was charged and discharged in the same environment until a total number of cycles reached 100 cycles, and the discharging capacity at $100^{th}$ cycle was measured. From the results, a room-temperature retention rate (%) of (the discharging capacity at the $100^{th}$ cycle/the discharging capacity at the $2^{nd}$ cycle)×100 was calculated. During charging, the secondary battery was charged with a current density of 1 mA/cm² until the voltage reached the upper limit voltage, and charging was performed until the current density reached 0.02 mA/cm² at the same upper limit voltage. During discharging, the secondary battery was discharged with a current density of 1 mA/cm² until the voltage reached a final voltage (3 V).

In a case of examining cycle characteristics at a low temperature, first, a battery state of the secondary battery was stabilized in the same procedure as in the case of examining the cycle characteristics at room temperature. Continuously, the secondary battery was charged and discharged again in a room-temperature environment (23° C.) and the discharging capacity at a $2^{nd}$ cycle was measured. Continuously, the secondary battery was retained (for three hours) in a low-temperature environment (−5° C.), and then, the secondary battery was charged and discharged in the low-temperature environment until the total number of cycles reached 50 cycles, and the discharging capacity at the $50^{th}$ cycle was measured. From the results, the low-temperature retention rate (%) of (the discharging capacity at the $50^{th}$ cycle/the discharging capacity at $2^{nd}$ cycle)×100 was calculated. Charging and discharging conditions were set to be the same as in the case of examining the cycle characteristics at room temperature.

TABLE 1

Electrolyte: Electrolyte solution, upper limit voltage: 4.35 V

| Experimental Examples | Positive electrode active material | Negative electrode active material | Boron compound Kind | Amount (% by weight) | Room-temperature retention rate (%) | Low-temperature retention rate (%) |
|---|---|---|---|---|---|---|
| 1-1 | LCO | Graphite | Formula (1-4) | 0.01 | 78.3 | 63 |
| 1-2 | | | | 0.1 | 92 | 74.2 |
| 1-3 | | | | 1 | 89.2 | 71.5 |
| 1-4 | | | | 3 | 72.6 | 58.3 |
| 1-5 | | | Formula (1-8) | 0.01 | 69.9 | 55.3 |
| 1-6 | | | | 0.1 | 74.6 | 59.6 |
| 1-7 | | | | 1 | 75.1 | 60.3 |
| 1-8 | | | | 3 | 71.6 | 53.2 |
| 1-9 | | | Formula (1-10) | 0.01 | 72.1 | 58 |
| 1-10 | | | | 0.1 | 84.9 | 68.4 |
| 1-11 | | | | 1 | 81.6 | 65.5 |
| 1-12 | | | | 3 | 71.8 | 58 |
| 1-13 | | | Formula (1-11) | 0.01 | 72.5 | 58.2 |
| 1-14 | | | | 0.1 | 78.6 | 63 |
| 1-15 | | | | 1 | 78.8 | 63.2 |
| 1-16 | | | | 3 | 69.1 | 55.5 |
| 1-17 | LCO | Graphite | — | — | 69.7 | 50.1 |
| 1-18 | | | Formula (16-1) | 1 | 80.9 | 44 |
| 1-19 | | | Formula (16-2) | 1 | 79.3 | 42.4 |
| 1-20 | | | Formula (16-3) | 1 | 74.9 | 41.7 |

In a case where the electrolyte solution included an additional boron compound (Experimental Examples 1-18 to 1-20), the room-temperature retention rate increased, but the low-temperature retention rate decreased in comparison to a case where the electrolyte solution did not include a different boron compound (Experimental Example 1-17).

In contrast, in a case where the electrolyte solution included a boron compound (Experimental Examples 1-1 to 1-16), the room-temperature retention rate increased and the low-temperature retention rate also increased in comparison to a case where the electrolyte solution did not include the boron compound (Experimental Example 1-17).

Particularly, when the amount of the boron compound in the electrolyte solution was 0.01% by weight to 3% by weight, a high room-temperature retention rate was obtained, and a high low-temperature retention rate was also obtained.

Experimental Examples 2-1 to 2-20

As shown in Table 2, a secondary battery was prepared in the same procedure except that the upper limit voltage was changed, and battery characteristics were examined.

TABLE 2

Electrolyte: Electrolyte solution, upper limit voltage: 4.45 V

| Experimental Examples | Positive electrode active material | Negative electrode active material | Boron compound Kind | Amount (% by weight) | Room-temperature retention rate (%) | Low-temperature retention rate (%) |
|---|---|---|---|---|---|---|
| 2-1 | LCO | Graphite | Formula (1-4) | 0.01 | 61.6 | 52.1 |
| 2-2 | | | | 0.1 | 78.7 | 60 |
| 2-3 | | | | 1 | 78.6 | 57.8 |
| 2-4 | | | | 3 | 55.5 | 47.4 |
| 2-5 | | | Formula (1-8) | 0.01 | 53.2 | 45.3 |
| 2-6 | | | | 0.1 | 60.3 | 49.4 |
| 2-7 | | | | 1 | 61.3 | 49.8 |
| 2-8 | | | | 3 | 52.9 | 43.3 |
| 2-9 | | | Formula (1-10) | 0.01 | 59.2 | 48.1 |
| 2-10 | | | | 0.1 | 73.2 | 55.7 |
| 2-11 | | | | 1 | 71.4 | 53.9 |
| 2-12 | | | | 3 | 55.9 | 47.3 |
| 2-13 | | | Formula (1-11) | 0.01 | 56.3 | 47.7 |
| 2-14 | | | | 0.1 | 66.4 | 52.2 |
| 2-15 | | | | 1 | 66.7 | 52.4 |
| 2-16 | | | | 3 | 53.3 | 45.3 |
| 2-17 | LCO | Graphite | — | — | 52.1 | 38.1 |
| 2-18 | | | Formula (16-1) | 1 | 64.1 | 34.2 |
| 2-19 | | | Formula (16-2) | 1 | 59.4 | 32.3 |
| 2-20 | | | Formula (16-3) | 1 | 60.1 | 31.6 |

Even when the upper limit voltage was changed, the same results as those in Table 1 were obtained. That is, when the electrolyte solution included a boron compound (Experimental Examples 2-1 to 2-16), a high room-temperature retention rate and a high low-temperature retention rate were obtained differently from other cases (Experimental Examples 2-17 to 2-20).

Experimental Examples 3-1 to 3-20

As shown in Table 3, a secondary battery was prepared in the same procedure except that a kind of the electrolyte was changed, and battery characteristics were examined.

In a case of forming a gel-like electrolyte (electrolyte layer 36), first, an electrolyte salt (LiPF$_6$) was dissolved in a mixed solvent (ethylene carbonate and propylene carbonate) to prepare a mixed solution in a sol state. In this case, a composition of the mixed solvent was set to ethylene carbonate:propylene carbonate=50:50 in terms of a weight ratio, and an amount of the electrolyte salt with respect to the mixed solvent was set to 1 mol/kg. Continuously, as shown in Table 3, a boron compound or an additional boron compound was added to the mixed solution as necessary, and the resultant mixed solution was stirred to prepare an electrolyte solution. Continuously, 30 parts by mass of electrolyte solution, 10 parts by mass of polymeric compound (copolymer of vinylidene fluoride and hexafluoropropylene), and 60 parts by mass of organic solvent (dimethyl carbonate) were mixed with each other to prepare a precursor solution. A copolymerization amount of hexafluoropropylene in the copolymer was 6.9% by mass. Finally, the precursor solution was applied to both surfaces of the positive electrode 33 and the negative electrode 34, respectively, and then the precursor solution was dried. According to this, the gel-like electrolyte layer 36 was formed.

TABLE 3

Electrolyte: Electrolyte solution, upper limit voltage: 4.35 V

| Experimental Examples | Positive electrode active material | Negative electrode active material | Boron compound Kind | Amount (% by weight) | Room-temperature retention rate (%) | Low-temperature retention rate (%) |
|---|---|---|---|---|---|---|
| 3-1 | LCO | Graphite | Formula (1-4) | 0.01 | 73.3 | 50 |
| 3-2 | | | | 0.1 | 86.2 | 58.1 |
| 3-3 | | | | 1 | 84 | 56.6 |
| 3-4 | | | | 3 | 67.7 | 47 |
| 3-5 | | | Formula (1-8) | 0.01 | 66 | 45.2 |
| 3-6 | | | | 0.1 | 69.9 | 48.2 |
| 3-7 | | | | 1 | 70 | 48.3 |
| 3-8 | | | | 3 | 66.4 | 43.1 |
| 3-9 | | | Formula (1-10) | 0.01 | 67.7 | 46.9 |
| 3-10 | | | | 0.1 | 79.7 | 54.1 |
| 3-11 | | | | 1 | 76.2 | 52.1 |
| 3-12 | | | | 3 | 67.9 | 47 |
| 3-13 | | | Formula (1-11) | 0.01 | 67.7 | 46.9 |
| 3-14 | | | | 0.1 | 73.6 | 50.6 |

TABLE 3-continued

Electrolyte: Electrolyte solution, upper limit voltage: 4.35 V

| Experimental Examples | Positive electrode active material | Negative electrode active material | Boron compound Kind | Amount (% by weight) | Room-temperature retention rate (%) | Low-temperature retention rate (%) |
|---|---|---|---|---|---|---|
| 3-15 | | | | 1 | 72.8 | 50 |
| 3-16 | | | | 3 | 67.8 | 45.1 |
| 3-17 | LCO | Graphite | — | — | 65.8 | 36 |
| 3-18 | | | Formula (16-1) | 1 | 77.3 | 32 |
| 3-19 | | | Formula (16-2) | 1 | 73 | 29.8 |
| 3-20 | | | Formula (16-3) | 1 | 71.3 | 30.5 |

Even when a kind of the electrolyte was changed, the same results as those in Table 1 were obtained. That is, when the electrolyte solution included the boron compound (Experimental Examples 3-1 to 3-16), a high room-temperature retention rate and a high low-temperature retention rate were obtained differently from other cases (Experimental Examples 3-17 to 3-20).

Experimental Examples 4-1 to 4-20

As shown in Table 4, a secondary battery was prepared in the same procedure except that a kind of the negative electrode active material was changed, and battery characteristics were examined.

In a case of forming the negative electrode active material layer 34B by using a metal-based material (silicon) as the negative electrode active material, first, 90 parts by mass of negative electrode active material (silicon), 5 parts by mass of polyimide precursor, and 5 parts by mass of negative electrode conductive agent (graphite) were mixed with each other to prepare a negative electrode mixture. An average particle size (median diameter D50) of silicon was set to 5 μm. As the polyimide precursor, an N-methyl-2-pyrrolidone solution of a polyamic acid was used. Continuously, the negative electrode mixture was dispersed in an organic solvent (N-methyl-2-pyrrolidone) to prepare negative electrode mixture slurry. Continuously, the negative electrode mixture slurry was uniformly applied to both surfaces of the negative electrode current collector 34A, and then the negative electrode mixture slurry was dried to form a negative electrode precursor layer. Continuously, the negative electrode precursor layer was compression-molded by using the roll pressing machine. Finally, the negative electrode precursor layer was heated in a vacuum atmosphere (400° C.×12 hours). According to this, polyimide, which is the negative electrode binding agent, was formed, and thus the negative electrode active material layer 34B was formed.

TABLE 4

Electrolyte: Electrolyte solution, upper limit voltage: 4.35 V

| Experimental Examples | Positive electrode active material | Negative electrode active material | Boron compound Kind | Amount (% by weight) | Room-temperature retention rate (%) | Low-temperature retention rate (%) |
|---|---|---|---|---|---|---|
| 4-1 | LCO | Silicon | Formula (1-4) | 0.01 | 69.9 | 52.7 |
| 4-2 | | | | 0.1 | 88.2 | 60.9 |
| 4-3 | | | | 1 | 84.9 | 58.6 |
| 4-4 | | | | 3 | 64.6 | 48.4 |
| 4-5 | | | Formula (1-8) | 0.01 | 55.7 | 45.7 |
| 4-6 | | | | 0.1 | 72.8 | 50.7 |
| 4-7 | | | | 1 | 71.2 | 51.4 |
| 4-8 | | | | 3 | 59.4 | 44.5 |
| 4-9 | | | Formula (1-10) | 0.01 | 65.3 | 48.9 |
| 4-10 | | | | 0.1 | 83.1 | 56.9 |
| 4-11 | | | | 1 | 79.8 | 54.6 |
| 4-12 | | | | 3 | 64.4 | 48.4 |
| 4-13 | | | Formula (1-11) | 0.01 | 58.7 | 48 |
| 4-14 | | | | 0.1 | 78.2 | 53.1 |
| 4-15 | | | | 1 | 74 | 52.1 |
| 4-16 | | | | 3 | 58.2 | 45.9 |
| 4-17 | LCO | Silicon | — | — | 57.1 | 40.2 |
| 4-18 | | | Formula (16-1) | 1 | 70.1 | 35.9 |
| 4-19 | | | Formula (16-2) | 1 | 67.3 | 33.8 |
| 4-20 | | | Formula (16-3) | 1 | 65.3 | 34.2 |

Even when a kind of the negative electrode active material was changed, the same results as those in Table 1 were obtained. That is, when the electrolyte solution included the boron compound (Experimental Examples 4-1 to 4-16), a high room-temperature retention rate and a high low-temperature retention rate were obtained differently from other cases (Experimental Examples 4-17 to 4-20).

Experimental Examples 5-1 to 5-20, and 6-1 to 6-20

As shown in Tables 5 and 6, a secondary battery was prepared in the same procedure except that a kind of the positive electrode active material was changed, and battery characteristics were examined.

As the positive electrode active material, $Li_{1.13}(Mn_{0.6}Ni_{0.2}Co_{0.2})_{0.87}Al_{0.01}O_2$ (LNCM) and $LiNi_{0.5}Mn_{1.5}O_4$ (LMNO) were used.

In a case of obtaining LNCM, first, nickel sulfate ($NiSO_4$), cobalt sulfate ($CoSO_4$), manganese sulfate ($MnSO_4$), and sodium aluminate ($NaAlO_2$) were mixed with each other. In this case, a mixing ratio (molar ratio) was set to Mn:Ni:Co=60:20:20, and Al:(Mn+Ni+Co)=1:86. Continuously, the resultant mixture was dispersed in water to prepare an aqueous solution, and then sodium hydroxide (NaOH) was added to the aqueous solution while sufficiently stirring the aqueous solution, thereby obtaining a coprecipitate (manganese-nickel-cobalt-aluminum composite coprecipitated hydroxide). Continuously, the coprecipitate was rinsed with water, and then was dried. Then, a lithium hydroxide monohydrate salt was added to the dried object, thereby obtaining a precursor. In this case, a mixing ratio (molar ratio) was set to Li:(Mn+Ni+Co+Al)=113:87. Finally, the precursor was fired in the air (800° C.×10 hours).

In a case of obtaining LMNO, lithium carbonate ($Li_2CO_3$), manganese oxide ($MnO_2$), and nickel oxide (NiO) were weighed in a predetermined molar ratio, and the weighed materials were mixed by using a ball mill. In this case, a mixing ratio (molar ratio) was set to Mn:Ni=15:5. Continuously, the resultant mixture was fired in the air (800° C.×10 hours), and then the fired object was cooled down. Finally, the fired object was mixed again by using a ball mill, and then the fired object was fired again in the air (700° C.×10 hours).

TABLE 5

Electrolyte: Electrolyte solution, upper limit voltage: 4.6 V

| Experimental Examples | Positive electrode active material | Negative electrode active material | Boron compound Kind | Amount (% by weight) | Room-temperature retention rate (%) | Low-temperature retention rate (%) |
|---|---|---|---|---|---|---|
| 5-1 | LNCM | Graphite | Formula (1-4) | 0.01 | 62.5 | 49 |
| 5-2 | | | | 0.1 | 80.9 | 57.8 |
| 5-3 | | | | 1 | 78.9 | 54.9 |
| 5-4 | | | | 3 | 58.6 | 45.4 |
| 5-5 | | | Formula (1-8) | 0.01 | 51.3 | 43.6 |
| 5-6 | | | | 0.1 | 65.1 | 47 |
| 5-7 | | | | 1 | 63.6 | 47.1 |
| 5-8 | | | | 3 | 52.4 | 40.4 |
| 5-9 | | | Formula (1-10) | 0.01 | 58.3 | 45.2 |
| 5-10 | | | | 0.1 | 73.5 | 52.3 |
| 5-11 | | | | 1 | 73.1 | 51.4 |
| 5-12 | | | | 3 | 57.8 | 44.7 |
| 5-13 | | | Formula (1-11) | 0.01 | 53 | 44.9 |
| 5-14 | | | | 0.1 | 70.1 | 49.1 |
| 5-15 | | | | 1 | 68.5 | 49.3 |
| 5-16 | | | | 3 | 53.1 | 42.8 |
| 5-17 | LNCM | Graphite | — | — | 51.4 | 40.1 |
| 5-18 | | | Formula (16-1) | 1 | 62.5 | 35.5 |
| 5-19 | | | Formula (16-2) | 1 | 61.4 | 34 |
| 5-20 | | | Formula (16-3) | 1 | 58.4 | 33.8 |

TABLE 6

Electrolyte: Electrolyte solution, upper limit voltage: 5 V

| Experimental Examples | Positive electrode active material | Negative electrode active material | Boron compound Kind | Amount (% by weight) | Room-temperature retention rate (%) | Low-temperature retention rate (%) |
|---|---|---|---|---|---|---|
| 6-1 | LMNO | Graphite | Formula (1-4) | 0.01 | 55.4 | 42.3 |
| 6-2 | | | | 0.1 | 69.1 | 48.8 |
| 6-3 | | | | 1 | 69.7 | 47.2 |
| 6-4 | | | | 3 | 50.1 | 38.3 |
| 6-5 | | | Formula (1-8) | 0.01 | 44.5 | 36.6 |
| 6-6 | | | | 0.1 | 57.9 | 41.6 |
| 6-7 | | | | 1 | 55.1 | 39.8 |
| 6-8 | | | | 3 | 47.3 | 36.5 |

TABLE 6-continued

Electrolyte: Electrolyte solution, upper limit voltage: 5 V

| Experimental Examples | Positive electrode active material | Negative electrode active material | Boron compound Kind | Amount (% by weight) | Room-temperature retention rate (%) | Low-temperature retention rate (%) |
|---|---|---|---|---|---|---|
| 6-9 | | | Formula (1-10) | 0.01 | 51.3 | 38.8 |
| 6-10 | | | | 0.1 | 65.6 | 45.4 |
| 6-11 | | | | 1 | 63 | 43.5 |
| 6-12 | | | | 3 | 50.8 | 38.5 |
| 6-13 | | | Formula (1-11) | 0.01 | 46 | 38.7 |
| 6-14 | | | | 0.1 | 61.5 | 42.1 |
| 6-15 | | | | 1 | 58.7 | 42.6 |
| 6-16 | | | | 3 | 46.3 | 36.3 |
| 6-17 | LMNO | Graphite | — | — | 45.1 | 31.6 |
| 6-18 | | | Formula (16-1) | 1 | 56.2 | 28.7 |
| 6-19 | | | Formula (16-2) | 1 | 52.9 | 26.4 |
| 6-20 | | | Formula (16-3) | 1 | 51.5 | 26.8 |

Even when a kind of the positive electrode active material was changed, the same results as those in Table 1 were obtained. That is, when the electrolyte solution included the boron compound (Experimental Examples 5-1 to 5-16, 6-1 to 6-16), a high room-temperature retention rate and a high low-temperature retention rate were obtained differently from other cases (Experimental Examples 5-17 to 5-20, 6-17 to 6-20).

From the results in Tables 1 to 6, it could be seen that when the electrolyte solution included the boron compound, the cycle characteristics were improved. Accordingly, excellent battery characteristics were obtained.

Hereinbefore, the present disclosure has been described with reference to embodiments and examples, but the present disclosure is not limited to the embodiments and the examples, and various medications can be made.

For example, description has been made with respect to a case where the battery structure is a cylindrical type and a laminated film type as an example, and a case where the battery element has a wound structure as an example, but there is no limitation thereto. The secondary battery of the present disclosure is also applicable to other battery structures such as a corner type, a coin type, and a button type, and is also applicable to a case where the battery element has other structures such as a laminated structure.

In addition, for example, the electrode reaction material may be other elements of Group 1 such as sodium (Na) and potassium (K), elements of Group 2 such as magnesium and calcium, or other light metals such as aluminum. The effect of the present disclosure can be obtained without depending on a kind of the electrode reaction material, and thus even when the kind of the electrode reaction material is changed, the same effect can be obtained.

In addition, the present disclosure may employ the following configurations.

(1) A secondary battery, including:
a positive electrode;
a negative electrode; and
a nonaqueous electrolyte solution,
wherein the nonaqueous electrolyte solution includes a boron compound having a quaternary structure expressed by Formula (1).

(2) The secondary battery according to (1),
wherein the boron compound includes at least one compound selected from compounds which are expressed by Formula (2) and Formula (3), respectively.

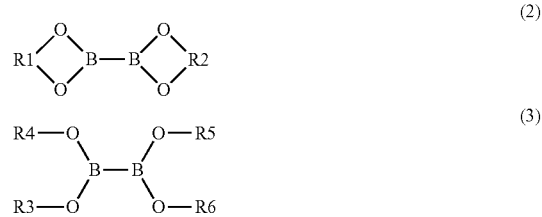

(provided that, each of R1 and R2 represents either a divalent hydrocarbon group or a divalent halogenated hydrocarbon group. Each of R3 to R6 represents any one of a hydrogen group, a halogen group, a monovalent hydrocarbon group, and a monovalent halogenated hydrocarbon group.)

(3) The secondary battery according to (2),
wherein the divalent hydrocarbon group is any one of an alkylene group, an alkenylene group, an alkynylene group, a cycloalkylene group, an arylene group, and a group in which two or more kinds of the groups are bonded so as to have two valences,
the divalent halogenated hydrocarbon group is a group in which at least one hydrogen group (—H) of the divalent hydrocarbon group is substituted with a halogen group,
the monovalent hydrocarbon group is any one of an alkyl group, an alkenyl group, an alkynyl group, a cycloalkyl group, an aryl group, and a group in which two or more kinds of the groups are bonded so as to have one valence, the monovalent halogenated hydrocarbon group is a group in which at least one hydrogen group of the monovalent hydrocarbon group is substituted with a halogen group, and the halogen group includes at least one kind of group selected among a fluorine group (—F), a chlorine group (—Cl), a bromine group (—Br), and an iodine group (—I).

(4) The secondary battery according to (2) or (3), wherein the divalent hydrocarbon group and the divalent halogenated hydrocarbon group have 1 to 10 carbon atoms, respectively, and the monovalent hydrocarbon group and the monovalent halogenated hydrocarbon group have 1 to 10 carbon atoms, respectively.

(5) The secondary battery according to any one of (2) to (4), wherein the compound expressed by Formula (2) includes at least one of compounds which are expressed by Formula (2-1) and Formula (2-2), respectively.

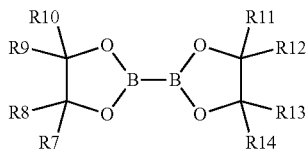

(2-1)

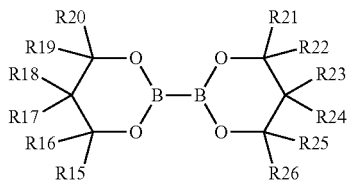

(2-2)

(provided that, each of R7 to R14 represents any one of a hydrogen group, a halogen group, a monovalent hydrocarbon group, and a monovalent halogenated hydrocarbon group. Each of R15 to R26 represents any one of a hydrogen group, a halogen group, a monovalent hydrocarbon group, and a monovalent halogenated hydrocarbon group.)

(6) The secondary battery according to any one of (1) to (5), wherein an amount of the boron compound in the nonaqueous electrolyte solution is 0.01% by weight to 3% by weight.

(7) The secondary battery according to any one of (1) to (6), wherein the secondary battery is a lithium secondary battery.

(8) A nonaqueous electrolyte solution for a secondary battery, including:

a boron compound having a quaternary structure expressed by Formula (1).

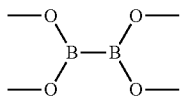

(1)

(9) A battery pack, including:
the secondary battery according to any one of (1) to (7);
a control unit that controls an operation of the secondary battery; and a switch unit that switches the operation of the secondary battery in response to an instruction from the control unit.

(10) An electrically driven vehicle, including:
the secondary battery according to any one of (1) to (7);
a conversion unit that converts power supplied from the secondary battery into a driving force;
a drive unit that drives in response to the drive force; and
a control unit that controls an operation of the secondary battery.

(11) A power storage system, including:
the secondary battery according to any one of (1) to (7);
one or more electrical apparatuses to which power is supplied from the secondary battery; and
a control unit that controls power supply to the electrical apparatuses from the secondary battery.

(12) An electrically driven tool, including:
the secondary battery according to any one of (1) to (7); and
a movable unit to which power is supplied from the secondary battery.

(13) An electronic apparatus, including:
the secondary battery according to any one of (1) to (7) as a power supply source.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A secondary battery, comprising: a positive electrode; a negative electrode; and a nonaqueous electrolyte solution, wherein the nonaqueous electrolyte solution includes a boron compound having a quaternary structure expressed by Formula (3):

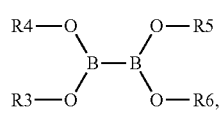

(3)

wherein each of R3 to R6 represents any one of a hydrogen group, a halogen group, a monovalent hydrocarbon group, and a monovalent halogenated hydrocarbon group, the monovalent hydrocarbon group comprises a group in which two or more kinds of alkynyl groups are coupled so as to have one valence, and the monovalent halogenated hydrocarbon group is a group in which at least one hydrogen group of the monovalent hydrocarbon group is substituted with a halogen group, and the halogen group includes at least one kind of group selected among a fluorine group (—F), a chlorine group (—Cl), a bromine group (—Br), and an iodine group (—I).

2. The secondary battery according to claim 1, wherein the monovalent hydrocarbon group and the monovalent halogenated hydrocarbon group have 1 to 10 carbon atoms, respectively.

3. The secondary battery according to claim 1, wherein an amount of the boron compound in the nonaqueous electrolyte solution is 0.01% by weight to 3% by weight.

4. The secondary battery according to claim 1, wherein the secondary battery is a lithium secondary battery.

5. The secondary battery according to claim 1, wherein each of R3 to R6 represents any one of a hydrogen group, a halogen group, and the monovalent halogenated hydrocarbon group.

6. A battery pack, comprising: a secondary battery; a control unit that controls an operation of the secondary battery; and a switch unit that switches the operation of the secondary battery in response to an instruction from the control unit, wherein the secondary battery includes: a positive electrode; a negative electrode; and a nonaqueous electrolyte solution, wherein the nonaqueous electrolyte solution includes a boron compound having a quaternary structure expressed by Formula (3):

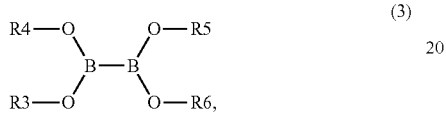

(3)

wherein each of R3 to R6 represents any one of a hydrogen group, a halogen group, a monovalent hydrocarbon group, and a monovalent halogenated hydrocarbon group,
the monovalent hydrocarbon group comprises a group in which two or more kinds of alkynyl groups are coupled so as to have one valence, and
the monovalent halogenated hydrocarbon group is a group in which at least one hydrogen group of the monovalent hydrocarbon group is substituted with a halogen group, and the halogen group includes at least one kind of group selected among a fluorine group (—F), a chlorine group (—Cl), a bromine group (—Br), and an iodine group (—I).

7. An electrically driven vehicle, comprising: a secondary battery; a conversion unit that converts power supplied from the secondary battery into a driving force; a drive unit that drives in response to the drive force; and a control unit that controls an operation of the secondary battery, wherein the secondary battery includes:
a positive electrode; a negative electrode; and a nonaqueous electrolyte solution, wherein the nonaqueous electrolyte solution includes a boron compound having a quaternary structure expressed by Formula (3):

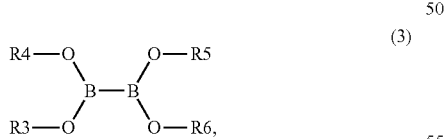

(3)

wherein each of R3 to R6 represents any one of a hydrogen group, a halogen group, a monovalent hydrocarbon group, and a monovalent halogenated hydrocarbon group,
the monovalent hydrocarbon group comprises a group in which two or more kinds of alkynyl groups are coupled so as to have one valence, and
the monovalent halogenated hydrocarbon group is a group in which at least one hydrogen group of the monovalent hydrocarbon group is substituted with a halogen group, and the halogen group includes at least one kind of group selected among a fluorine group (—F), a chlorine group (—Cl), a bromine group (—Br), and an iodine group (—I).

8. A power storage system, comprising: a secondary battery; one or more electrical apparatuses to which power is supplied from the secondary battery; and a control unit that controls power supply to the electrical apparatuses from the secondary battery, wherein the secondary battery includes: a positive electrode; a negative electrode; and a nonaqueous electrolyte solution, wherein the nonaqueous electrolyte solution includes a boron compound having a quaternary structure expressed by Formula (3):

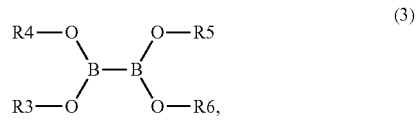

(3)

wherein each of R3 to R6 represents any one of a hydrogen group, a halogen group, a monovalent hydrocarbon group, and a monovalent halogenated hydrocarbon group,
the monovalent hydrocarbon group comprises a group in which two or more kinds of alkynyl groups are coupled so as to have one valence, and
the monovalent halogenated hydrocarbon group is a group in which at least one hydrogen group of the monovalent hydrocarbon group is substituted with a halogen group, and the halogen group includes at least one kind of group selected among a fluorine group (—F), a chlorine group (—Cl), a bromine group (—Br), and an iodine group (—I).

9. An electrically driven tool, comprising: a secondary battery; and a movable unit to which power is supplied from the secondary battery, wherein the secondary battery includes: a positive electrode; a negative electrode; and a nonaqueous electrolyte solution, wherein the nonaqueous electrolyte solution includes a boron compound having a quaternary structure expressed by Formula (3):

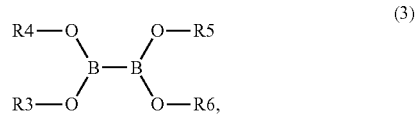

(3)

wherein each of R3 to R6 represents any one of a hydrogen group, a halogen group, a monovalent hydrocarbon group, and a monovalent halogenated hydrocarbon group,
the monovalent hydrocarbon group comprises a group in which two or more kinds of alkynyl groups are coupled so as to have one valence, and
the monovalent halogenated hydrocarbon group is a group in which at least one hydrogen group of the monovalent hydrocarbon group is substituted with a halogen group, and the halogen group includes at least one kind of group selected among a fluorine group (—F), a chlorine group (—Cl), a bromine group (—Br), and an iodine group (—I).

10. An electronic apparatus, comprising: a secondary battery as a power supply source, wherein the secondary battery includes: a positive electrode; a negative electrode; and a nonaqueous electrolyte solution, wherein the nonaqueous electrolyte solution includes a boron compound having a quaternary structure expressed by Formula (3):

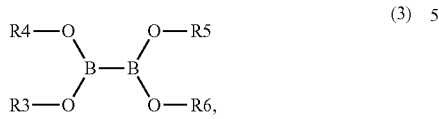

wherein each of R3 to R6 represents any one of a hydrogen group, a halogen group, a monovalent hydrocarbon group, and a monovalent halogenated hydrocarbon group, the monovalent hydrocarbon group comprises a group in which two or more kinds of alkynyl groups are coupled so as to have one valence, and the monovalent halogenated hydrocarbon group is a group in which at least one hydrogen group of the monovalent hydrocarbon group is substituted with a halogen group, and the halogen group includes at least one kind of group selected among a fluorine group (—F), a chlorine group (—Cl), a bromine group (—Br), and an iodine group (—I).

* * * * *